United States Patent
Levinson

(10) Patent No.: US 8,233,798 B2
(45) Date of Patent: Jul. 31, 2012

(54) PARALLEL TRANSMISSION OF DATA STREAMS IN A STAR-CONFIGURED NETWORK

(76) Inventor: Frank H. Levinson, Tiburon, CA (US)

( * ) Notice: Subject to any disclaimer, the term of this patent is extended or adjusted under 35 U.S.C. 154(b) by 896 days.

(21) Appl. No.: 12/198,865

(22) Filed: Aug. 26, 2008

(65) Prior Publication Data

US 2009/0080887 A1 Mar. 26, 2009

Related U.S. Application Data

(60) Provisional application No. 60/975,133, filed on Sep. 25, 2007.

(51) Int. Cl.
*H04J 14/00* (2006.01)
*H04B 10/00* (2006.01)
(52) U.S. Cl. ............... 398/68; 398/73; 398/164
(58) Field of Classification Search .......... 398/66–69, 398/73, 164
See application file for complete search history.

(56) References Cited

U.S. PATENT DOCUMENTS

| | | | |
|---|---|---|---|
| 4,590,619 A | 5/1986 | Winzer | 455/612 |
| 4,596,052 A | 6/1986 | Wright et al. | 455/619 |
| 4,701,909 A | 10/1987 | Kavehrad et al. | 370/85 |
| 4,797,879 A | 1/1989 | Habbab et al. | 370/3 |
| 4,916,705 A | 4/1990 | Glance | 372/20 |
| 5,002,350 A | 3/1991 | Dragone | 350/96.15 |
| 5,035,480 A | 7/1991 | Dutt | 350/96.15 |
| 5,052,051 A | 9/1991 | Naito et al. | 455/619 |
| 5,127,067 A | 6/1992 | Delcoco et al. | 385/24 |
| 5,351,146 A | 9/1994 | Chan et al. | 359/118 |
| 5,404,241 A * | 4/1995 | Ota | 398/63 |
| 5,463,461 A * | 10/1995 | Horiuchi et al. | 356/484 |
| 6,374,020 B1 | 4/2002 | Paniccia | 385/47 |
| 6,411,418 B1 * | 6/2002 | Deri et al. | 398/182 |
| 6,501,092 B1 | 12/2002 | Nikonov et al. | 257/29 |
| 6,563,986 B2 | 5/2003 | Kashihara et al. | 385/37 |
| 6,587,605 B2 | 7/2003 | Paniccia et al. | 385/14 |
| 6,697,553 B2 | 2/2004 | Bhardwaj et al. | 385/37 |
| 6,999,664 B2 | 2/2006 | Nicolaescu et al. | 385/50 |
| 7,085,501 B1 | 8/2006 | Rickard et al. | 398/202 |
| 7,116,847 B2 | 10/2006 | Liu et al. | 385/8 |
| 7,139,455 B1 | 11/2006 | Gunn, III | 385/37 |
| 7,194,166 B1 | 3/2007 | Gunn, III | 385/37 |
| 7,230,227 B2 * | 6/2007 | Wilcken et al. | 250/214 A |
| 2005/0244158 A1 * | 11/2005 | Luft | 398/59 |
| 2008/0247765 A1 * | 10/2008 | Mahgerefteh et al. | 398/187 |
| 2009/0238567 A1 * | 9/2009 | Miller et al. | 398/59 |
| 2010/0221007 A1 * | 9/2010 | Sakamoto et al. | 398/67 |
| 2011/0150499 A1 * | 6/2011 | Sala et al. | 398/154 |

OTHER PUBLICATIONS

Kirman et al., "On-Chip Optical Technology in Future Bus-Based Multicore Designs," Micro, IEEE, vol. 27, No. 1, pp. 56-66, Jan.-Feb. 2007; doi: 10.1109/MM.2007.18; URL:http://ieeexplore.ieee.org/stamp/stamp.jsp?tp=&arnumber=4205124&isnumber=4205111.*
Kiman, N., et al., "On-Chip Optical Technology in Future Bus-Based Multicore Designs," IEEE Computer Society, 2007, pp. 56-66.
Pezeshki, B., et al., "20mW Widely Tunable Laser Module Using DFB Array and MEMs Selection," Optical Society of America, 2002, 3 pages.

* cited by examiner

*Primary Examiner* — Nathan Curs
(74) *Attorney, Agent, or Firm* — Morgan, Lewis & Bockius LLP

(57) ABSTRACT

A data communications network includes N nodes, where N is an integer greater than one, and a star coupler coupled to each of the N nodes. Each node includes a transmitter and a receiver. The star coupler is configured to receive, in parallel, data streams transmitted from a plurality of the N nodes, and to passively retransmit, in parallel, each of the received data streams to each node of the N nodes. Each receiver is configured to receive multiple data streams in parallel.

24 Claims, 16 Drawing Sheets

PARALLEL TRANSMISSION OF DATA STREAMS IN A STAR-CONFIGURED NETWORK

RELATED APPLICATIONS

This application claims priority under 35 U.S.C. 119 to U.S. Provisional Patent Application No. 60/975,133, filed Sep. 25, 2007, "Parallel Transmission of Data Streams in a Star-Configured Network," which is hereby incorporated by reference in its entirety.

TECHNICAL FIELD

The disclosed embodiments relate generally to data communications, and more particularly, to data communications involving a star-configured network.

BACKGROUND

Networks in which nodes are coupled to switches or routers through serial data links may achieve high bandwidth at a cost of high latencies. For example, data packets are delayed by queuing and processing at a switch or router. Furthermore, serial data links limit nodes to receiving a single packet at a time.

Accordingly, there is a need for network architectures and for transmitter and receiver architectures that reduce or eliminate latencies associated with switching and routing, and that allow for parallel receipt of multiple data streams corresponding to multiple respective data packets.

SUMMARY

A data communications network includes N nodes, where N is an integer greater than one, and a star coupler coupled to each of the N nodes. Each node includes a transmitter and a receiver. The star coupler is configured to receive, in parallel, data streams transmitted from a plurality of the N nodes, and to passively retransmit, in parallel, each of the received data streams to each node of the N nodes. Each receiver is configured to receive multiple data streams in parallel.

A data communications network, for use in conjunction with an optical channel having a first terminus and a second terminus, includes a first set of M nodes and a second set of N nodes, where M and N are integers greater than one. Each node of the first and second sets includes a transmitter and a receiver. The network also includes a first star coupler coupled to the first set of M nodes and to the first terminus of the optical channel, and a second star coupler coupled to the second set of N nodes and to the second terminus of the optical channel. The first star coupler is configured to receive, in parallel, data streams transmitted from a plurality of the M nodes, and to passively retransmit each of the received data streams to the second star coupler and to each node of the M nodes, wherein the passively retransmitted data streams comprise a set of parallel data streams. The second star coupler is configured to receive, in parallel, the set of parallel data streams retransmitted by the first star coupler and to passively retransmit the set of received data streams to each of the N nodes. Each receiver is configured to receive multiple data streams in parallel.

A network interface at a node in a network of N nodes, where N is an integer greater than one, includes a receiver configured to receive in parallel from a star coupler multiple data streams transmitted on respective multiple wavelengths of a set of wavelengths. The receiver includes a plurality of parallel photodetectors. Each photodetector is configured to convert an optical signal on a respective wavelength of the multiple wavelengths into an electrical signal. The network interface also includes a transmitter configured to transmit data streams to a star coupler at a respective wavelength of the set of wavelengths. The star coupler is configured to receive, in parallel, data streams transmitted from a plurality of the N nodes, and to passively retransmit, in parallel, each of the received data streams to each node of the N nodes.

A method of communicating data is used in conjunction with a network of N nodes, wherein each node includes a transmitter and a receiver, and is performed at a first node in the network of N nodes. In the method, a first data stream is transmitted to a star coupler coupled to each of the N nodes. The star coupler is configured to receive, in parallel, data streams transmitted from a plurality of the N nodes, and to passively retransmit, in parallel, each of the received data streams to each node of the N nodes. Multiple data streams are received in parallel from the star coupler.

A data communications circuit includes means for transmitting, at a first node in a network of N nodes, a first data stream to a star coupler coupled to each of the N nodes. The star coupler is configured to receive, in parallel, data streams transmitted from a plurality of the N nodes, and to passively retransmit, in parallel, each of the received data streams to each node of the N nodes. The circuit also includes means for receiving multiple data streams in parallel from the star coupler.

A semiconductor integrated circuit is configured for on-chip optical communications. The integrated circuit includes a first optical channel; a first optical transmitter coupled to the first optical channel, to drive a data stream onto the first optical channel at a respective transmission wavelength; and a first optical receiver coupled to the first optical channel. The first optical receiver includes a first coherent optical detector configured to receive the data stream at the respective transmission wavelength.

A method of communicating data is used in conjunction with a network of N nodes implemented on a semiconductor integrated circuit. Each node comprises a transmitter and a receiver. In the method, a transmitter at a first node in the network of N nodes drives a data stream onto an optical channel at a respective transmission wavelength. A receiver at a second node coupled to the optical channel performs coherent optical detection to receive the data stream.

BRIEF DESCRIPTION OF THE DRAWINGS

Like reference numerals refer to corresponding parts throughout the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments. The term "data stream" is used in this document to mean a sequence of digitally encoded information, which may include instructions (e.g., commands, executable programs or instructions, procedure calls, and/or configuration settings) as well as data.

Figure 1A:
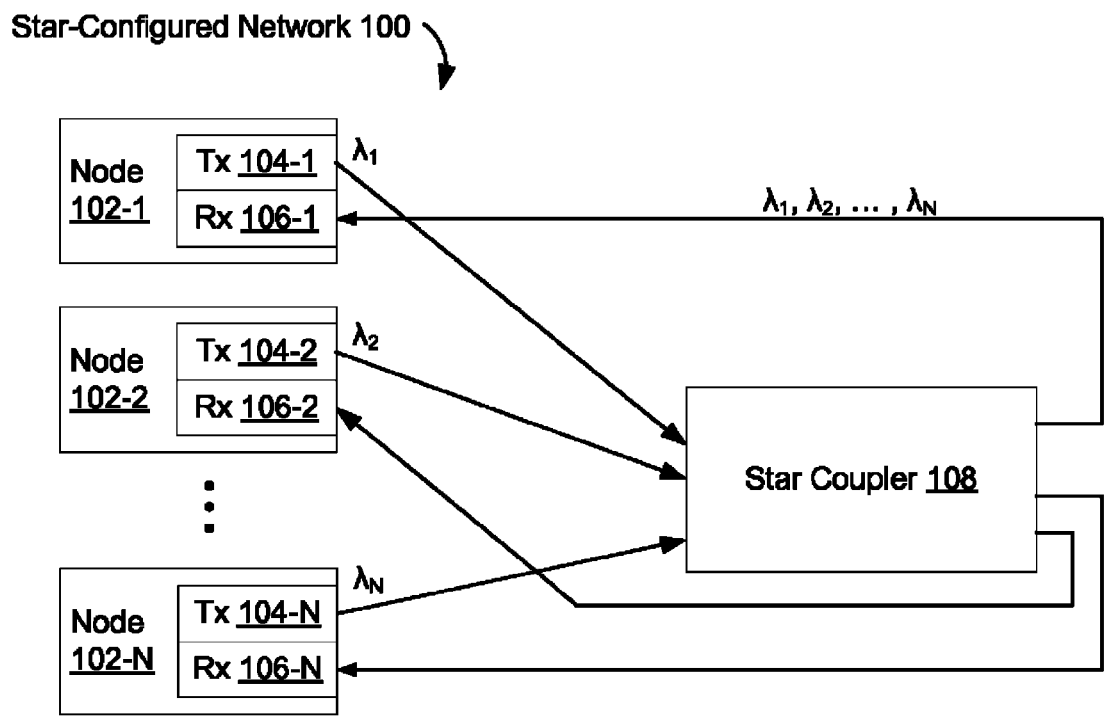
FIGS. 1A and 1B are schematic diagrams of a star-configured network in accordance with some embodiments.

FIG. 1A is a schematic diagram of a star-configured network 100 in accordance with some embodiments. The network 100 includes N nodes 102, where N is an integer greater than one. In some embodiments, N is at least three, or at least four, or at least eight. Each node includes a transmitter 104 and a receiver 106. In some embodiments, the transmitters 104 are optical transmitters and the receivers 106 are optical receivers.

The transmitters 104 and receivers 106 are coupled to a star coupler 108. For example, the transmitters 104 and receivers 106 may be coupled to the star coupler 108 by optical fibers. Optical fibers may also be used to interconnect the nodes and star couplers in the embodiments shown in FIGS. 2, 3, and 4. Each optical connection between a respective transmitter 104 or receiver 106 (of a node 102) and a star coupler may be implemented using a respective optical fiber. The optical fibers transmit data streams, in the form of optical signals, between the interconnected system components. Star couplers 108 generally have distinct input ports and output ports, each of which is configured to be coupled to an optical fiber for receiving or transmitting optical signals carrying a respective data stream.

The star coupler 108 is configured to receive data streams transmitted by one or more transmitters 104, including receiving in parallel multiple data streams transmitted from multiple respective nodes by multiple respective transmitters 104, and to retransmit, in parallel, each of the received data streams to each of the N nodes 102. The star coupler 108 is configured to passively retransmit the received data streams in parallel. Each of the receivers 106 is configured to receive multiple data streams in parallel. Thus, each of the receivers 106 is configured to receive in parallel the data streams (or a subset of the data streams) that the star coupler 108 retransmits in parallel. However, in some embodiments it is possible that a respective receiver 106 may be configured (either temporarily or permanently) to receive only one, or fewer than N, of the parallel data streams retransmitted by the star coupler 108, if the node containing that receiver 106 only needs to receive the data in only one, or in fewer than N, of the parallel data streams. The number of nodes that transmit data to the star coupler 108 at any one time may be less than N.

Furthermore, in some embodiments the network 100 includes, in addition to the N nodes 102, one or more "listener" nodes that never, or rarely, transmit data to the star coupler 108 and/or one or more "talk only" nodes that transmit data to the star coupler 108 but do not receive data from the star coupler. Examples of "talk only" nodes include sensors. Examples of "listener" nodes include nodes that participate in a computation and produce a side result, or display results, but do not contribute information to the computation. A communication protocol associated with a network including these nodes would need to accommodate the fact that these nodes do not support message acknowledgments.

When a first node 102-1 and a second node 102-2 simultaneously transmit respective first and second data streams, the star coupler 108 receives the first and second data streams in parallel and retransmits the first and second data streams in parallel to each of the N nodes. Each node 102 receives the first and second data streams in parallel. If a particular data stream is addressed to a particular node, other nodes receiving the particular data stream may simply discard the data stream.

Because the star coupler 108 retransmits received data streams to each of the N nodes, latencies associated with switching are eliminated. In some embodiments, transmission delays are limited to delays from light travel time between the nodes 102 and the star coupler 108, as well as any delays associated with the receivers 106. Furthermore, retransmission of received data streams to each of the N nodes 102 allows information to be distributed simultaneously to multiple nodes 102. Thus, the network 100 enables efficient multicasting to each node 102 or to a subset of the nodes 102.

In some embodiments, the star coupler 108 is a passive fiber optic coupler, such as a fused biconical taper coupler or a coupler implemented using planar waveguides in glass or silicon. The use of a passive optical component eliminates the risk of power failure: the network 100 lacks a centralized switch or router that could lose power and take down the network. In some embodiments the star coupler has an optical amplifier to boost received signals before they are split to the coupler's output ports.

In some embodiments, each transmitter 104 is configured to transmit data streams at a distinct transmission wavelength of a set of wavelengths. A first transmitter 104-1 at a first node 102-1 is configured to transmit at a first wavelength $\lambda_1$; a second transmitter 104-2 at a second node 102-2 is configured to transmit at a second wavelength $\lambda_2$, and an Nth transmitter 104-N at an Nth node 102-N is configured to transmit at an Nth wavelength $\lambda_N$.

Each receiver 106 is configured to receive in parallel multiple data streams transmitted on respective wavelengths of the set of wavelengths. For example, if the star coupler receives and retransmits in parallel first and second data streams transmitted by the first 104-1 and second 104-2 transmitters, each receiver 106 receives the first and second data streams on respective first and second wavelengths $\lambda_1$ and $\lambda_2$ in parallel. If every transmitter 104 transmits respective data streams simultaneously at distinct respective transmission wavelengths, the star coupler will receive and retransmit every data stream in parallel and every receiver 106 will receive in parallel every data stream, such that each data stream is received on its distinct respective transmission wavelength.

In some embodiments, the distinct transmission wavelength associated with a transmitter 104 is tunable. For example, the transmitter 104 may include a tunable semiconductor laser, such as a tunable external cavity laser in which a semiconductor gain block is matched to a microelectromechanical system (MEMs) or other tunable grating structure with appropriate lensing. Another alternative is a distributed Bragg reflector (DBR) laser or distributed feedback (DFB) laser that can be monolithically implemented in semiconductor material.

Figure 1B:
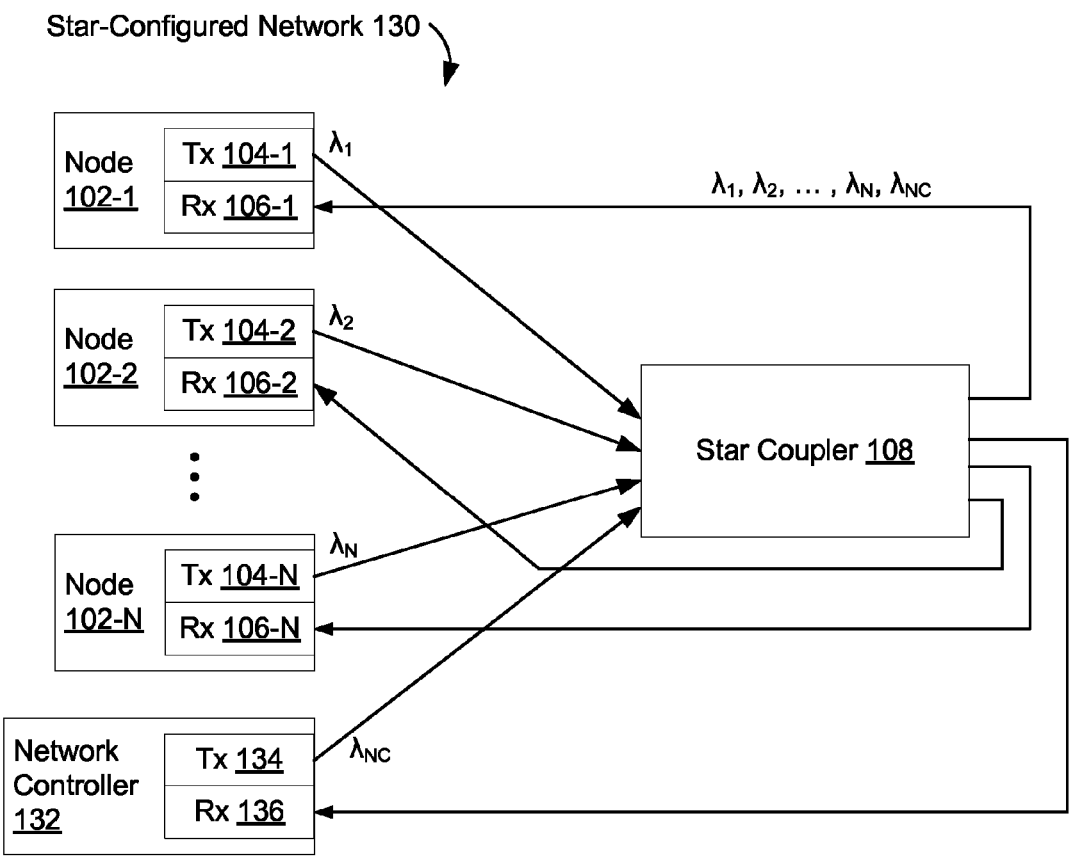

FIG. 1B is a schematic diagram of a star-configured network 130 in accordance with some embodiments. In addition to the components of network 100, the network 130 includes a network controller 132 coupled to the star coupler 108. The network controller 132 includes a transmitter 134 and a receiver 136. In some embodiments, the network controller assigns a wavelength from an available set of wavelengths to a transmitter 104 at a node 102. The transmitter 104 then tunes its transmission wavelength to the assigned wavelength. For example, upon booting up, a node 102 may transmit to the star coupler 108 a data stream that includes a request, addressed to the network controller 132, for a wavelength assignment. The data stream will be received by all nodes 102 and by the network controller 132, but each node 102 will discard the request, because it is not addressed to that particular node. The network controller 132 will process the request and respond by transmitting a data stream that includes a wavelength assignment addressed to the requesting node 102. In some embodiments, the network controller performs other network housekeeping functions, such as system quality monitoring, wavelength reassignments, and overall shutdown management.

In some embodiments, the wavelengths in the available set of wavelengths range between 1530 nm and 1570 nm (C-band), or between 1270 nm and 1610 nm (including C, L, S and other bands). In some embodiments, the available number of wavelengths in the set of wavelengths is at least three or at least four, or eight or more, or 16 or more. In some embodiments, the available number of wavelengths in the set of wavelengths is greater than or equal to 32, or greater than or equal to 80, or at least 160. For example, at least 40 or even 80 wavelengths may be available in the C-band alone.

In some embodiments, the network controller 132 uses a dedicated channel to communicate with the nodes 102. For example, the transmitter 134 may transmit on a distinct wavelength $\lambda_{NC}$. The star coupler 108 is configured to receive data streams transmitted by the transmitter 134 and to retransmit the data streams to each node 102 and to the network controller 132. If the star coupler 108 simultaneously receives data streams transmitted by one or more nodes 102 and by the network controller 132, the star coupler will retransmit the data stream from the transmitter 134 of the network controller 132 in parallel with the data streams from the one or more nodes 102.

In some embodiments, the network controller 132 is incorporated into a node 102. The network controller may use the transmission wavelength of the node into which it is incorporated to communicate to other nodes. For example, the network controller may assign a transmission wavelength to a particular node 102 by transmitting to the star coupler 108 a data stream addressed to the particular node 102 and containing the wavelength assignment.

In some embodiments, a node 102 corresponds to a network switch or other network component. For example, the star coupler 108 may serve as a network backbone connecting multiple network switches. In some embodiments, a node 102 corresponds to a processor or cluster of processors. For example, the star coupler 108 may connect multiple processors or clusters of processors in a local area network (LAN).

Figure 2:
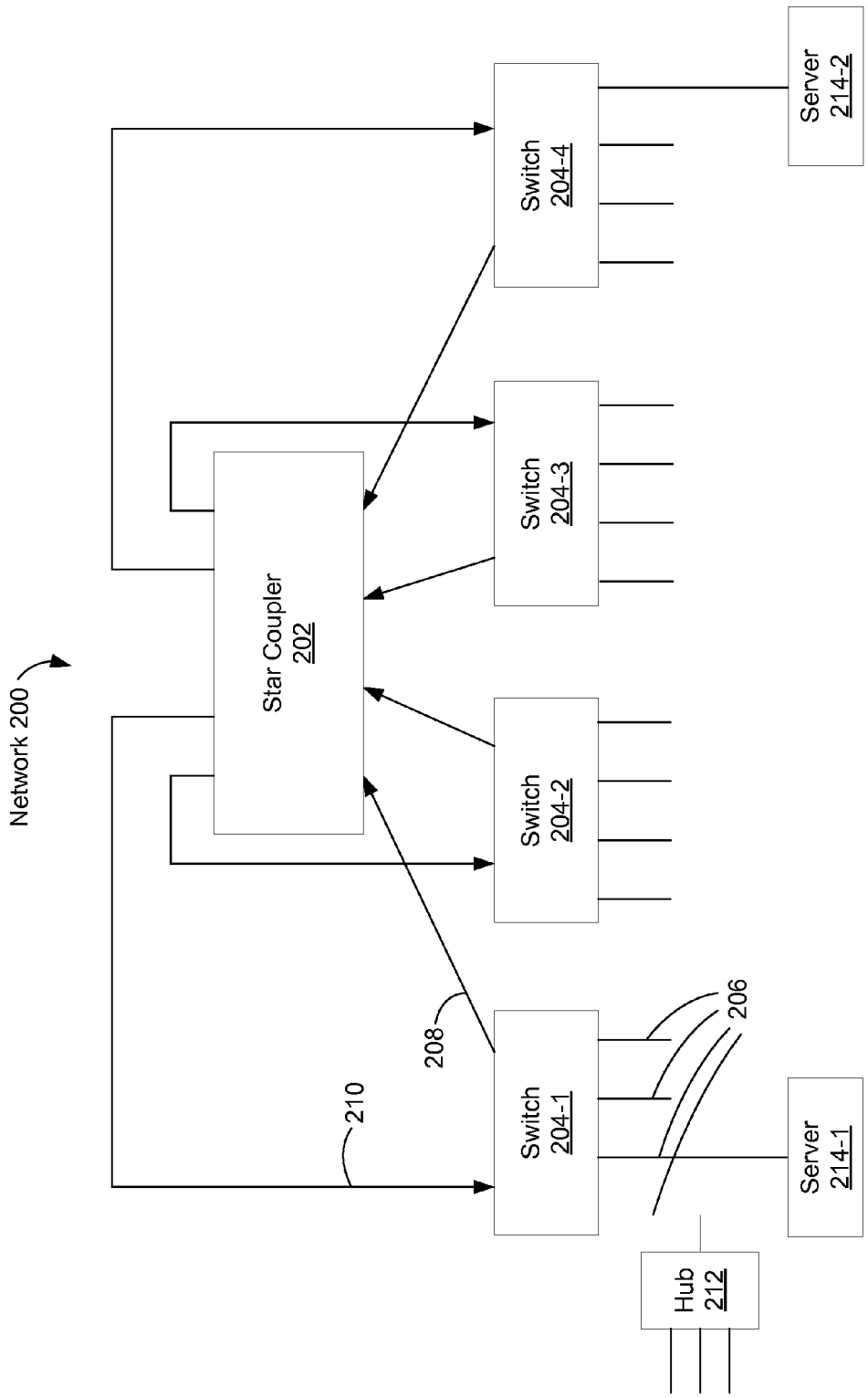
FIG. 2 is a schematic diagram of a network including a star coupler and a plurality of network switches coupled to the star coupler, in accordance with some embodiments.

FIG. 2 is a schematic diagram of a network 200 including a star coupler 202 and a plurality of network switches 204 coupled to the star coupler 202, in accordance with some embodiments. The network switches 204 correspond to the nodes 102 of FIG. 1A. Each network switch 204 is configured to transmit data streams to the star coupler 202 via a signal line 208 and to receive multiple data streams in parallel from the star coupler 202 via a signal line 210. Each network switch 204 also is coupled to other network components (e.g., a hub 212 or a server 214) via signal lines 206.

A first network component coupled to a first network switch (e.g., 204-1) may communicate with a second network component coupled to a second network switch (e.g., 204-4) by transmitting a data stream to the first network switch. The first network switch 204-1 transmits the data stream to the star coupler 202, which retransmits the data stream to each network switch 204. The second network switch 204-4 retransmits the data stream to the second network component.

For example, a server 214-1, coupled to a switch 204-1, may communicate to another server 214-2, coupled to another switch 204-4, by transmitting a data stream to the switch 204-1. The switch 204-1 transmits the data stream to the star coupler 202, which retransmits the data stream to each switch 204. Switches 204-1, 204-2, and 204-3 receive the retransmitted data stream, which is not addressed to any network component coupled to any of the three switches, and discard it. Switch 204-4 receives the data stream and forwards it to server 214-2.

In the example of FIG. 2, the star coupler 202 takes the place of a core router in a network backbone application. Latencies resulting from routing delays (e.g., queuing and processing delays) are eliminated by simply retransmitting a received data stream to each switch 204.

Figure 3:
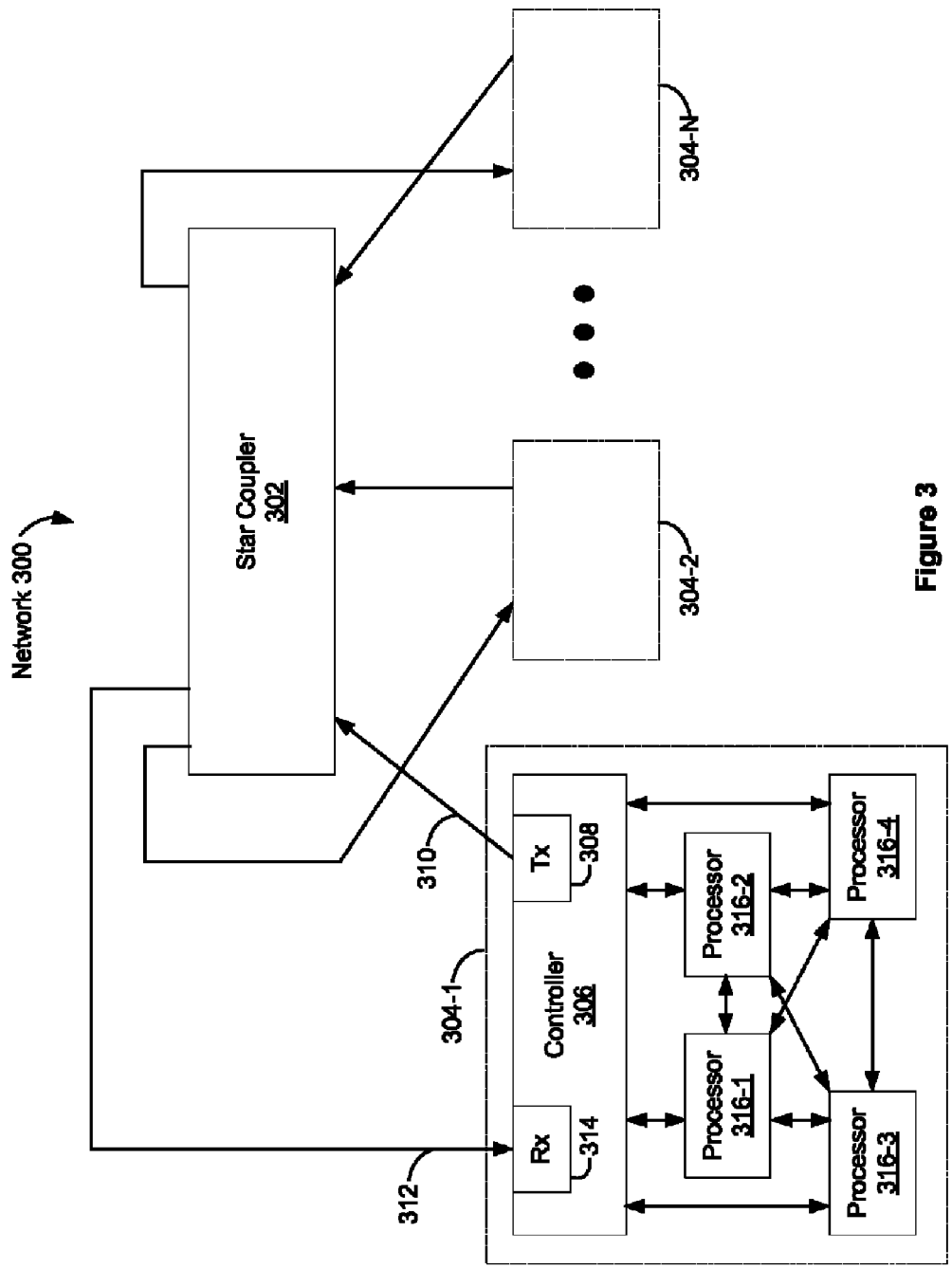
FIG. 3 is a schematic diagram of a network including a star coupler and a plurality of clusters of processors coupled to the star coupler, in accordance with some embodiments.

FIG. 3 is a schematic diagram of a network 300, including a star coupler 302 and a plurality of clusters 304 of processors 316 coupled to the star coupler 302, in accordance with some embodiments. The clusters 304 of processors 316 correspond to the nodes 102 of FIG. 1A. The star coupler 302 connects the clusters 304 of processors in a LAN. In some embodiments, each cluster 304 of processors corresponds to a separate computer. In some embodiments, the clusters 304 of processors coupled through the star coupler 302 effectively form a single supercomputer.

In some embodiments, a cluster 304 of processors includes multiple processors 316 coupled in a mesh, such as a mesh using the HyperTransport protocol (HyperTransport is a trademark of the HyperTransport Technology Consortium). Each processor 316 may include multiple processing cores, such as two cores or four cores. Thus, for example, each of the four processors 316 in the cluster 304-1 may include four cores, for a total of 16 processing cores in the cluster. In another example, a cluster may include eight processors, each with four cores, for a total of 32 cores per cluster.

A controller 306, such as a network interface card (NIC), receives data streams from the processors 316 for transmission outside of the cluster 304-1 (e.g., for transmission to one or more processors in another cluster 304). The controller includes a transmitter 308 corresponding to a transmitter 104 in FIG. 1A and a receiver 314 corresponding to a receiver 106 in FIG. 1A.

Thus, for example, the processor 316-2 in cluster 304-1 may communicate to a processor in cluster 304-N by transmitting a data stream to the controller 306. The data stream has a destination address associated with the destination processor in cluster 304-N. The controller 306 transmits the data stream to the star coupler 302, which retransmits the data stream to each cluster 304. The controllers 306 of each cluster except cluster 304-N receive and discard the retransmitted data stream. The controller 306 of cluster 304-N (not shown) receives the retransmitted data stream and forwards the retransmitted data stream to the destination processor for processing.

In the example of FIG. 3, the star coupler 302 takes the place of a network switch in a traditional LAN. Latencies resulting from switching delays are eliminated by passively retransmitting received data streams to each cluster of processors 304.

In embodiments in which nodes 102 correspond to respective processors or clusters of processors, the simultaneous distribution of information to multiple nodes can improve computing efficiency for applications such as finite element analysis (e.g., grid problems). For example, a processor that calculates a value (i.e., a state) for a cell in a grid can efficiently broadcast the calculated value to other nodes that then use the calculated value to calculate values for other cells in the grid during a subsequent computational iteration. In some embodiments, a destination address for a data stream containing a calculated value specifies multiple nodes for which the data stream is intended. In some embodiments, a node examines the source address of a received data stream to determine whether the data stream was transmitted by a node from which information is expected or needed.

In some embodiments, a first set of nodes coupled to a first star coupler and a second set of nodes coupled to a second star coupler may be joined in a single network by coupling the first and second star couplers. In some embodiments, signals transmitted between the star couplers are optically amplified.

Figure 4A:
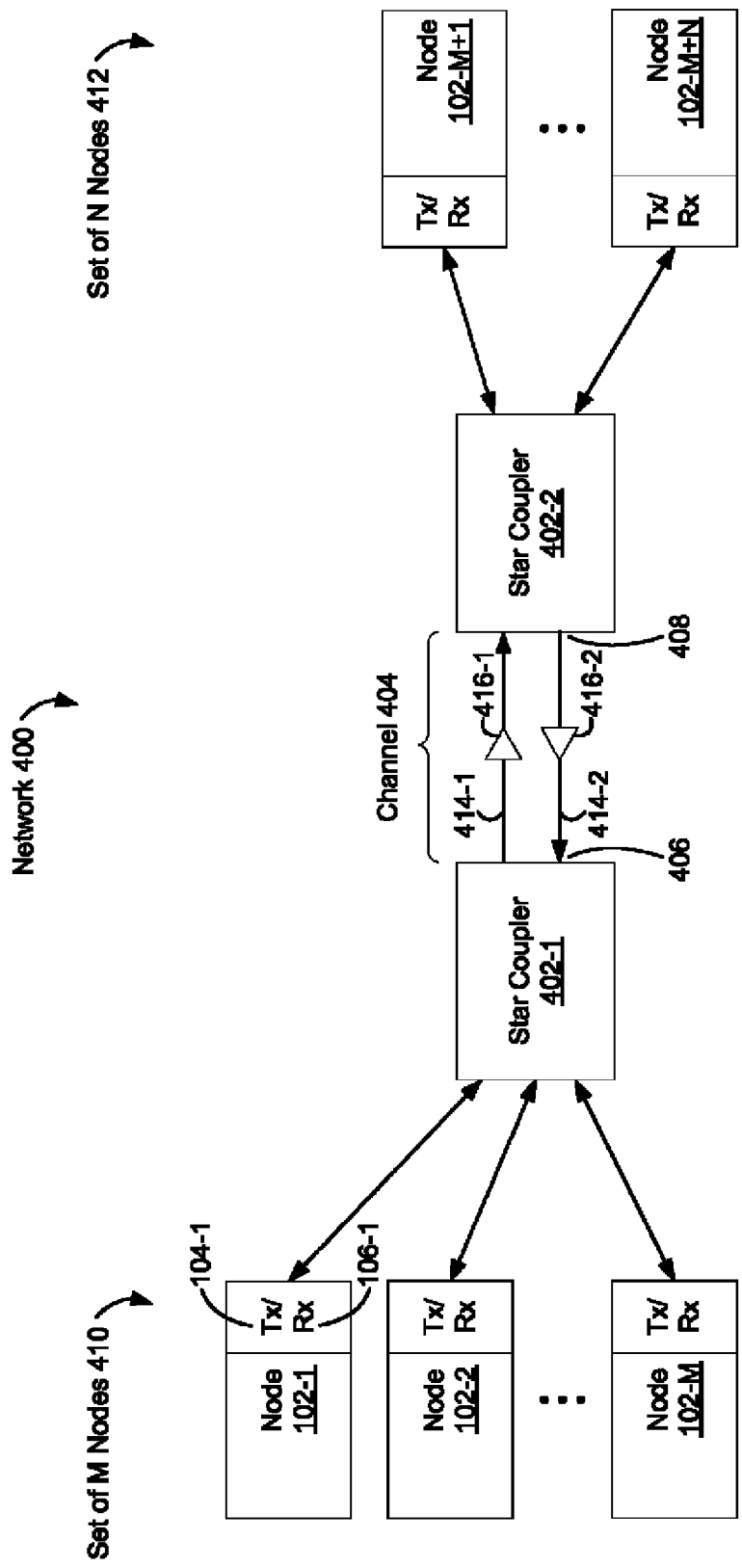
FIG. 4A is a schematic diagram of a network including a first set of M nodes coupled to a first star coupler and a second set of N nodes coupled to a second star coupler, in accordance with some embodiments.

FIG. 4A is a schematic diagram of a network 400 including a first set 410 of M nodes 102 coupled to a first star coupler 402-1 and a second set 412 of N nodes coupled to a second star coupler 402-2, in accordance with some embodiments. Each node 102 includes a transmitter 104 and a receiver 106, as described with regard to FIG. 1A. For visual clarity, the connections between a star coupler 402 and the transmitter 104 and receiver 106 of a respective node 102 are shown as a single line. The first star coupler 402-1 is coupled to a first terminus 406 of a channel 404 and the second star coupler is coupled to a second terminus 408 of the channel 404.

In some embodiments, the channel 404 is an optical channel. For example, the channel 404 includes two optical fibers 414-1 and 414-2, one for traffic in each direction. In some embodiments, the optical fibers 414 include respective optical amplifiers 416-1 and 416-2, such as erbium-doped fiber amplifiers (EDFAs), to boost signal levels of data streams transmitted between the star couplers 402. In some embodiments, the optical amplifiers boost signals to levels that are similar to levels of signals transmitted by transmitters 104.

A data stream transmitted from a node 102 in the first set 410 of M nodes to the first star coupler 402-1 is passively retransmitted by the first star coupler 402-1 to each node 102 in the first set 410. In addition, the first star coupler 402-1 passively retransmits the data stream to the second star coupler 402-2, which retransmits the data stream to each node 102 in the second set 412 of N nodes. Similarly, the second star coupler 402-2 passively retransmits a data stream received from a node 102 in the second set 412 to each node 102 in the second set 412 and to the first star coupler 402-2, which passively retransmits the data stream to each node 102 in the first set 410.

If the first star coupler 402-1 receives in parallel multiple data streams from respective multiple nodes 102 in the first set 410, the first star coupler retransmits the multiple data streams in parallel to each node 102 in the first set 410 and to the second star coupler 402-2. The second star coupler 402-2 retransmits the multiple data streams in parallel to each node 102 in the second set 412. Similarly, if the second star coupler 402-2 receives in parallel multiple data streams from respective multiple nodes 102 in the second set 412, the second star coupler retransmits the multiple data streams in parallel to each node 102 in the second set 412 and also to the first star coupler 402-1, which retransmits the multiple data streams in parallel to each node 102 in the first set 410. In some embodiments, first and/or second star couplers 402-1 and 402-2 passively retransmit multiple received data streams in parallel. To avoid wavelength conflicts, each node 102 in the combined sets of nodes 410 and 412 transmits at a unique wavelength. In some embodiments, each node 102 in the combined sets of nodes 410 and 412 transmits at a distinct wavelength in a given band. In some embodiments, each node 102 in the set 410 uses a distinct wavelength in a first band and each node 102 in the set 412 uses a distinct wavelength in a second band of wavelengths.

In some embodiments, each star coupler 402 is configured not to retransmit to the other star coupler 402 data streams received from the other star coupler 402, thus preventing data streams from looping between the first and second star couplers 402-1 and 402-2. For example, data streams received at the second star coupler 402-2 from the first star coupler 402-1 are retransmitted to each node 102 in the second set 412 of N nodes, but are not retransmitted to the first star coupler 402-1. In some embodiments, retransmission is blocked using optical blocking filters.

In some embodiments, a set of nodes coupled to a first star coupler and a set of network components (e.g., coupled to a second star coupler) may be joined in a single network by coupling the first and second star couplers. In other words, one or more of the nodes 102 coupled to the second star coupler 402-2 may be network components. More generally, in the context of FIG. 4A, one or more of the nodes coupled to either of the star couplers 402 may be network components. For example, a respective node 102 coupled to either star coupler 402 may be a network switch, router or hub.

Figure 4B:
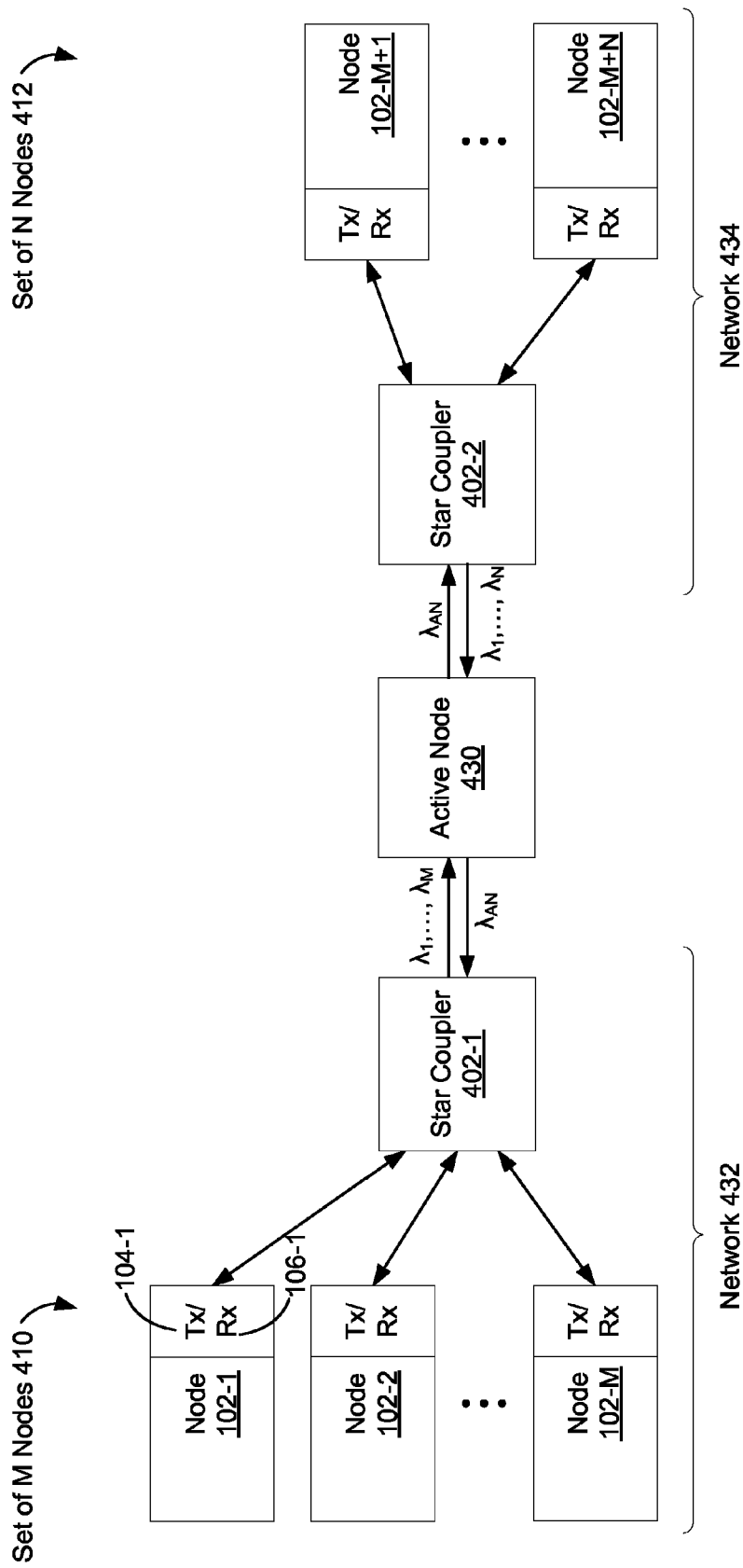
FIG. 4B is a schematic diagram of a network including two star-configured networks coupled together through an active node in accordance with some embodiments.

In some embodiments, the first star coupler 402-1 and the second star coupler 402-2 are coupled together through an active node 430, as shown in FIG. 4B. The first set of M nodes 410, coupled together through the first star coupler 402-1, constitutes a first network 432, and the second set of N nodes 412, coupled together through the second star coupler 402-2, constitutes a second network 434. The active node 430 filters received data streams such that a data stream received from one of the networks 432 or 434 is only forwarded to the other network 434 or 432 if it is intended for one or more nodes 102 in the other network. In some embodiments, the active node 430 retransmits received data streams at a wavelength or set of wavelengths $\lambda_{AN}$ specific to the active node. In some embodiments, the wavelength(s) are outside the set of wavelengths reserved for nodes 102 in a network 432 or 434. For example, wavelengths reserved for transmitters 104 in a network 432 or 434 could be from the C-Band while wavelengths reserved for active nodes 430 could be from the L-Band. Thus, a transmitter 102-1 in the network 432 could transmit at the same wavelength $\lambda_1$ as a transmitter 102-M+1 in the network 434, without any conflict. Receivers 106 are configured to receive data streams transmitted at wavelengths specific to the active node 430 as well as at wavelengths reserved for nodes 102 in the respective network 432 or 434.

Figure 5A:
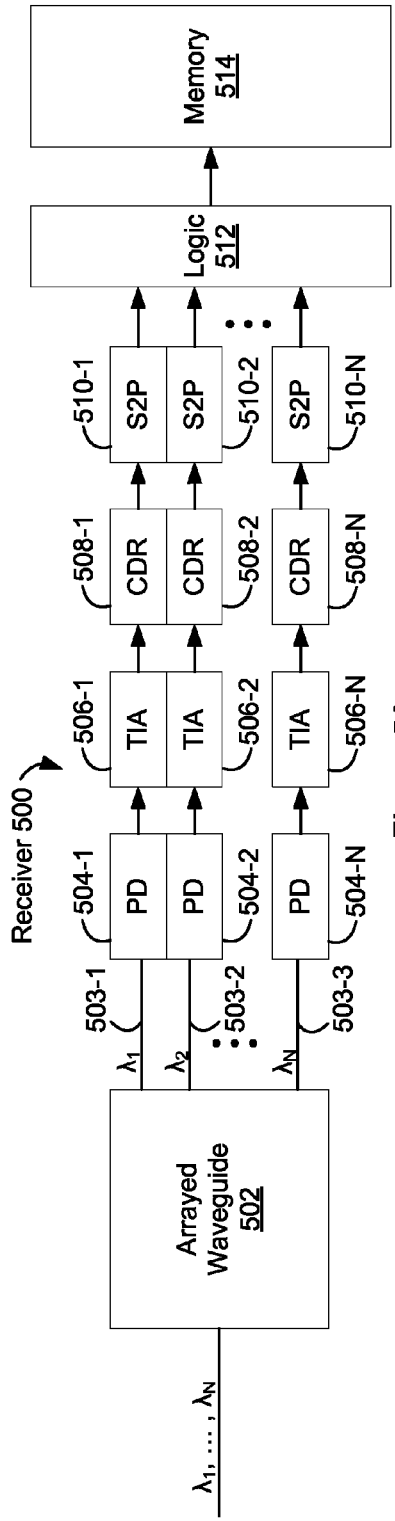
FIG. 5A is a schematic diagram of a receiver configured to receive in parallel multiple data streams transmitted on respective multiple wavelengths of a set of wavelengths, in accordance with some embodiments.

FIG. 5A is a schematic diagram of a receiver 500 configured to receive in parallel multiple data streams transmitted on respective multiple wavelengths of a set of wavelengths, in accordance with some embodiments. In some embodiments, a receiver 106 (FIG. 1A) of a node 102 in a star-configured network 100 is implemented as the receiver 500, such that the receiver 500 simultaneously receives the multiple data streams from a star coupler 108.

An arrayed waveguide (AWG) demultiplexer 502 receives the multiple data streams (e.g., from the star coupler 108) and separates the multiple data streams into parallel channels 503 corresponding to respective multiple wavelengths $\lambda_i$ of the set of wavelengths $\lambda_1$ to $\lambda_N$. In some embodiments, instead of using an AWG, lenses and gratings (i.e., grating dispersal optics) are used to separate the multiple data streams into parallel channels directed onto a photodiode array.

Parallel photodetectors (PDs) 504 convert optical signals on respective channels 503 into electrical signals. For example, the parallel photodetectors 504 include a linear array of photodiodes in which each photodiode is configured to receive a different wavelength from an AWG or grating dispersal optics. An optical signal on a respective channel 503 corresponds to a received data stream separated onto the respective channel 503 by the AWG 502. In some embodiments, the photodetectors 504 are PIN photodiodes, or avalanche photodiodes (APDs). In some embodiments, the receiver 500 includes photodetectors 504 to convert optical signals on 3 or more, or on 4 or more, or on 8 or more of the available wavelengths into electrical signals. In some embodiments, the receiver 500 includes photodetectors 504 to convert optical signals on all of the available wavelengths into electrical signals, where the available number of wavelengths is greater than or equal to 8, or 16, or 32, or 80, or 160.

Transimpedance amplifiers (TIAs) 506 amplify the electrical signals from the photodetectors 504 and provide the amplified electrical signals to clock and data recovery (CDR) circuits 508, which extract serial data from the electrical signals and provide the extracted serial data to serial-to-parallel (S2P) converters 510 (i.e., deserializers). The S2P converters 510 provide parallelized data to logic 512.

In some embodiments, the logic circuitry 512 is configured to assemble data packets, to store the assembled data packets, and to prioritize processing of the assembled data packets. Further details and embodiments of logic circuitry 512 are discussed below. In some embodiments, the logic circuitry 512 is configured to process an assembled packet if a first destination-based criterion is satisfied and to discard an assembled packet if a second destination-based criterion is satisfied.

In some embodiments, the TIAs 506, CDR 508, S2P converters 510, and logic 512 are implemented on a single integrated circuit, such as a silicon integrated circuit. The TIAs 506 are implemented, for example, using SiGe transistors. Furthermore, in some embodiments the single integrated circuit includes the parallel photodetectors 504, which may be implemented using SiGe-based detectors. Implementing multiple components of the receiver 500 on a single integrated circuit reduces the size and cost of the receiver 500 and eases integration into a larger system corresponding to a node 102.

Figure 5B:
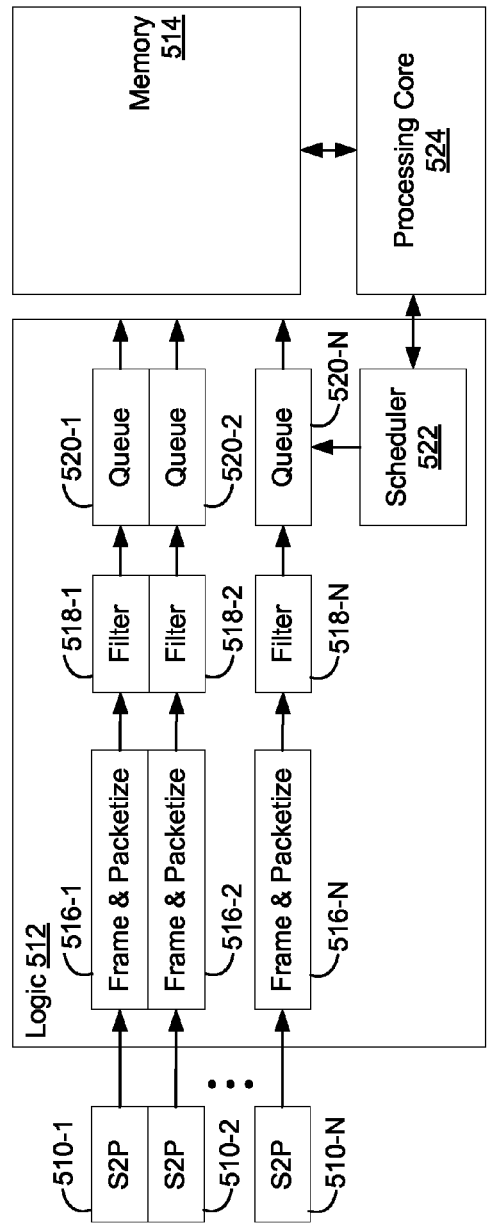
FIG. 5B is a schematic diagram of circuitry in a receiver in accordance with some embodiments.

FIG. 5B is a schematic diagram of the logic circuitry 512 and memory 514 in accordance with some embodiments. The S2P converters 510 provide parallelized data to circuitry 516 that frames the parallelized data and assembles the framed data into packets. A filter 518 will pass an assembled packet on to a queue 520 if a first destination-based criterion is satisfied and will discard an assembled packet if a second destination-based criterion is satisfied. For example, the first destination-based criterion may be whether the packet is addressed to the node corresponding to the receiver 500 (e.g., whether the packet is addressed to a processing core within the node) and the second destination-based criterion may be whether the packet is not addressed to the node corresponding to the receiver 500. In another example, in which the node corresponding to the receiver 500 is a network switch, the first destination-based criterion may be whether the packet is addressed to a network component coupled to the node and the second destination-based criterion may be whether the packet is not addressed to a network component coupled to the node.

In some embodiments, circuitry 516 assembles a packet header and provides the packet header, which includes a destination address for the packet, to the filter 518. The filter 518 examines the contents of the packet header, including the destination address. If the contents of the packet header satisfy a first destination-based criterion, circuitry 516 proceeds to assemble the entire packet. If the contents of the packet header satisfy a second destination-based criterion, the filter 518 discards the data corresponding to the unassembled packet.

Queues 520 store assembled data packets for transfer to memory 514, where applications executed by a processing core 524 can access the data. A scheduler 522 coupled to the processing core 524 and to the queues 520 controls the transfer of data from the queues 520 to memory 514. For example, the receiver 500 may receive in parallel multiple data streams, each corresponding to a respective application to be executed by the processing core 524. The scheduler 522 may prioritize execution of the respective applications by ordering transfer of data corresponding to the respective data streams from the respective queues 520 to memory 514. For example, the scheduler 522 may order the transfer of data from the queues 520 to memory 514 to ensure that the processing core 524 does not stall. For example, the processing core 524 dynamically provides the scheduler 522 lists specifying which data packets to transfer to memory 514 and/or specifying the order in which data packets are to be transferred. In some embodiments, the scheduler 522 is integrated into the processing core 524.

Memory 514 may include high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. Memory 514 may include one or more storage devices remotely located from the processing core 524 and may include memory embedded in the processing core 524. In some embodiments, memory 514 is external to the receiver 500.

In the example of FIG. 5B, each channel 503 has corresponding dedicated framing and packetizing circuitry 516, filters 518, and queues 520. In some embodiments, framing and packetizing circuitry, filters, and/or queues are shared between two or more channels. Such embodiments may involve additional queuing. For example, if multiple channels share framing and packetizing circuitry, parallelized data may be queued prior to the shared framing and packetizing circuitry.

In some embodiments, bandwidth between components (e.g., integrated circuits) in a receiver 500 is sufficiently large that the node corresponding to the receiver 500 can process data faster than data can be delivered to the node. For example, in some embodiments, memory 514 has sufficient bandwidth to receive data from the queues 520 for the respective channels at the aggregated speed at which the data arrives in the queues, once data not intended for the particular node corresponding to the receiver 500 has been discarded by the filters 518. The queues 520 thus can simultaneously transfer data to memory 514 without queuing delays. Nevertheless, the scheduler 522 still may prioritize the transfer of data from particular queues 520 to the memory 514, based on the needs (e.g., based on active threads) of the processing core 524.

In some embodiments, transmission credits are used to control traffic flow in the network 100. For example, if a first node 102-1 initiated communication with a second node 102-2, the second node 102-2 would transmit a data stream addressed to the first node 102-1 that specified a number of frames that the second node 102-2 was prepared to receive. The second node 102-2 thus could ensure that the queue 520-1 for buffering data received from the first node 102-1 did not overflow. As the second node 102-2 processed the received data stored in the queue 520-1 and thereby freed memory in the queue 520-1, the second node 102-2 would transmit additional data streams addressed to the first node 102-1 that assigned additional transmission credits to the first node 102-1.

In some embodiments in which a node corresponds to a cluster of processors (e.g., processors 316 in node 304, FIG. 3), each processor has its own dedicated buffering (e.g., a queue 520) with its own transmission credits. Furthermore, if a respective processor includes multiple processing cores, each processing core may have its own dedicated buffering (e.g., a queue 520) with its own transmission credits. Management of separate queues for separate processors or processor cores helps to improve the efficiency of the processors or processor cores. In some embodiments, a star-configured network implementing a transmission credits protocol includes 100 or more, or 1000 or more buffer and credit management state machines.

Although not shown in FIG. 5B, logic circuitry 512 may optionally include circuitry for generating data validation values (e.g., CRC check values) or the like, and/or a processor or other logic for processing, managing, deleting (or invalidating), and/or outputting the data received by the logic circuitry 512.

Figure 6A:
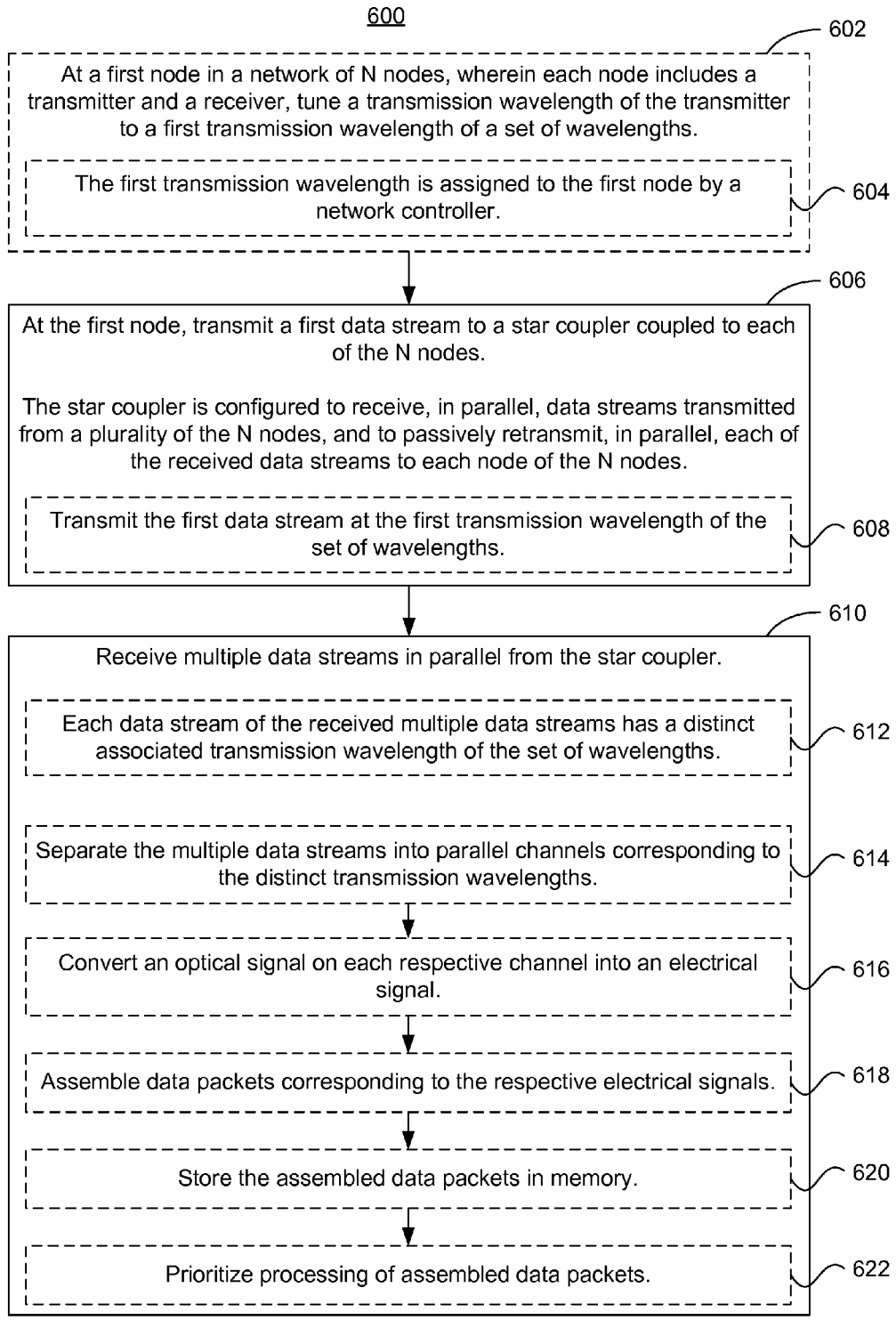
FIGS. 6A and 6B are flow diagrams illustrating methods of communicating data, for use in conjunction with a network of N nodes, in accordance with some embodiments.
Figure 6B:
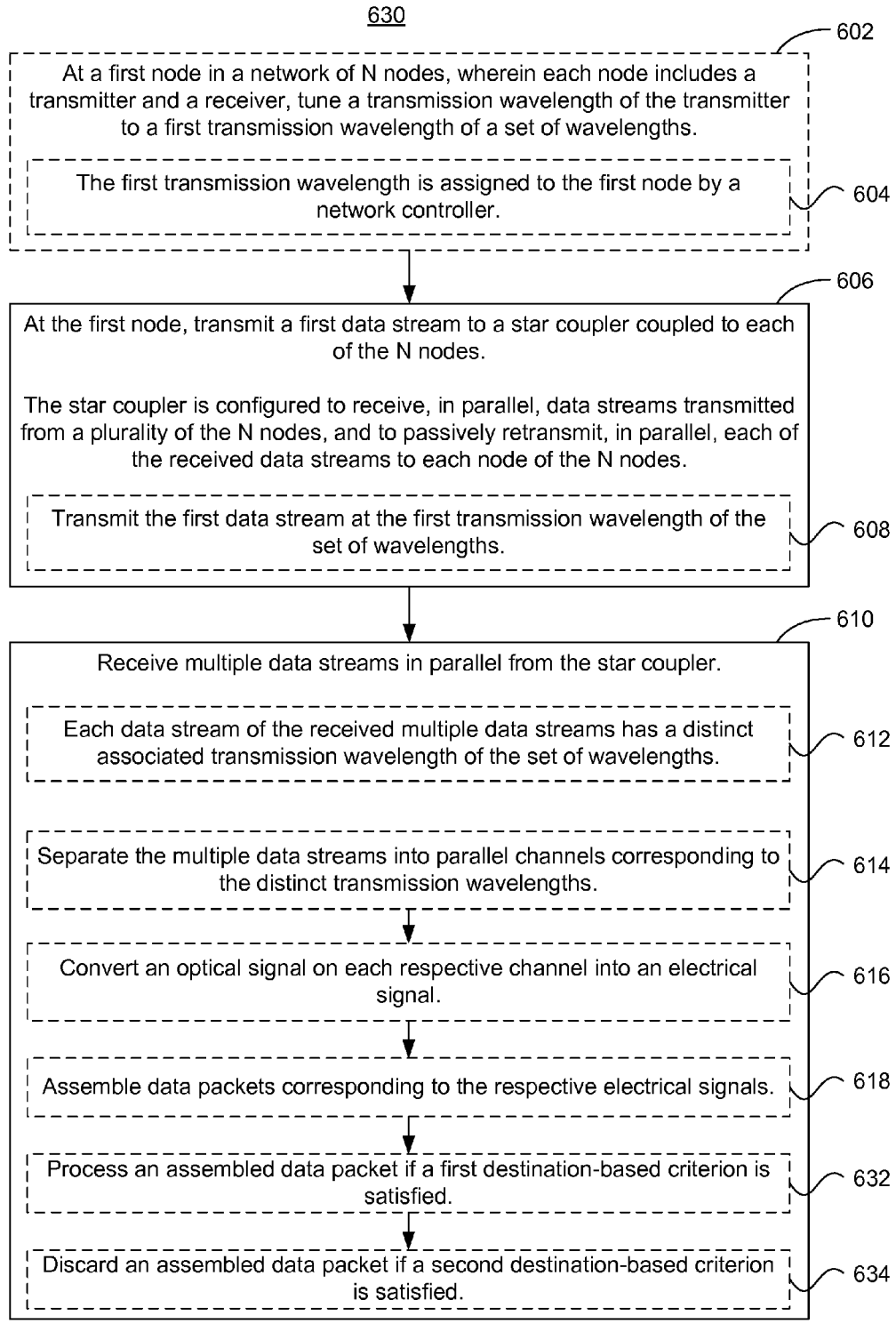

FIGS. 6A and 6B are flow diagrams illustrating methods 600 (FIG. 6A) and 630 (FIG. 6B) of communicating data, for use in conjunction with a network (e.g., network 100, FIG. 1) of N nodes (e.g., nodes 102), in accordance with some embodiments. Each node includes a transmitter (e.g., 104) and a receiver (e.g., 106). In some embodiments, in addition to the N nodes, the network includes one or more "listener" nodes and/or one or more "talk only" nodes, as described above.

In some embodiments, at a first node in the network of N nodes, a transmission wavelength of the transmitter is tuned (602) to a first transmission wavelength of a set of wavelengths. In some embodiments, the first transmission wavelength is assigned (604) to the first node by a network controller (e.g., 132, FIG. 1B).

At the first node, a first data stream is transmitted (606) to a star coupler (e.g., 108) coupled to each of the N nodes. The star coupler is configured to receive, in parallel, data streams transmitted from a plurality of the N nodes and to passively retransmit, in parallel, each of the received data streams to each node of the N nodes. In some embodiments, the first data stream is transmitted (608) at the first transmission wavelength of the set of wavelengths.

Multiple data streams are received (610) in parallel from the star coupler. In some embodiments, each data stream of the received multiple data streams has a distinct associated transmission wavelength of the set of wavelengths (612).

In some embodiments, the multiple data streams are separated (614) into parallel channels corresponding to the distinct transmission wavelengths. For example, an AWG 502 separates the multiple data streams into parallel channels 503. In some embodiments, an optical signal on each respective channel is converted (616) into an electrical signal (e.g., by photodiodes 504). In some embodiments, data packets corresponding to the respective electrical signals are assembled (618). For example, circuitry 516 (FIG. 5B) frames data and assembles the framed data into packets, the data having been parallelized by a serial-to-parallel converter 510.

In some embodiments, the assembled data packets are stored (620, FIG. 6A) in memory (e.g., queues 520 or memory 514). In some embodiments, processing of assembled data packets is prioritized (622, FIG. 6A) (e.g., by a scheduler 522).

In some embodiments, an assembled data packet is processed if a first destination-based criterion is satisfied (632, FIG. 6B) and is discarded if a second destination-based criterion is satisfied (634, FIG. 6B). For example, a filter 518 compares a packet's destination address to an address of the node corresponding to the receiver 500. If the addresses match, the packet is forwarded to a queue 520 and on to memory 514 for subsequent processing by a processing core 524. If the addresses do not match, the filter 518 discards the packet.

While the methods 600 and 630 described above include operations that appear to occur in a specific order, it should be apparent that the methods 600 and 630 can include more or fewer operations, that an order of two or more of the operations can be changed, that two or more of the operations can be performed in parallel, and that two or more operations can be combined into a single operation. For example, operation 610 can be performed prior to or in parallel with operation 606. In another example, the methods 600 and 630 can include transmission credit management flow control operations.

Figure 7:
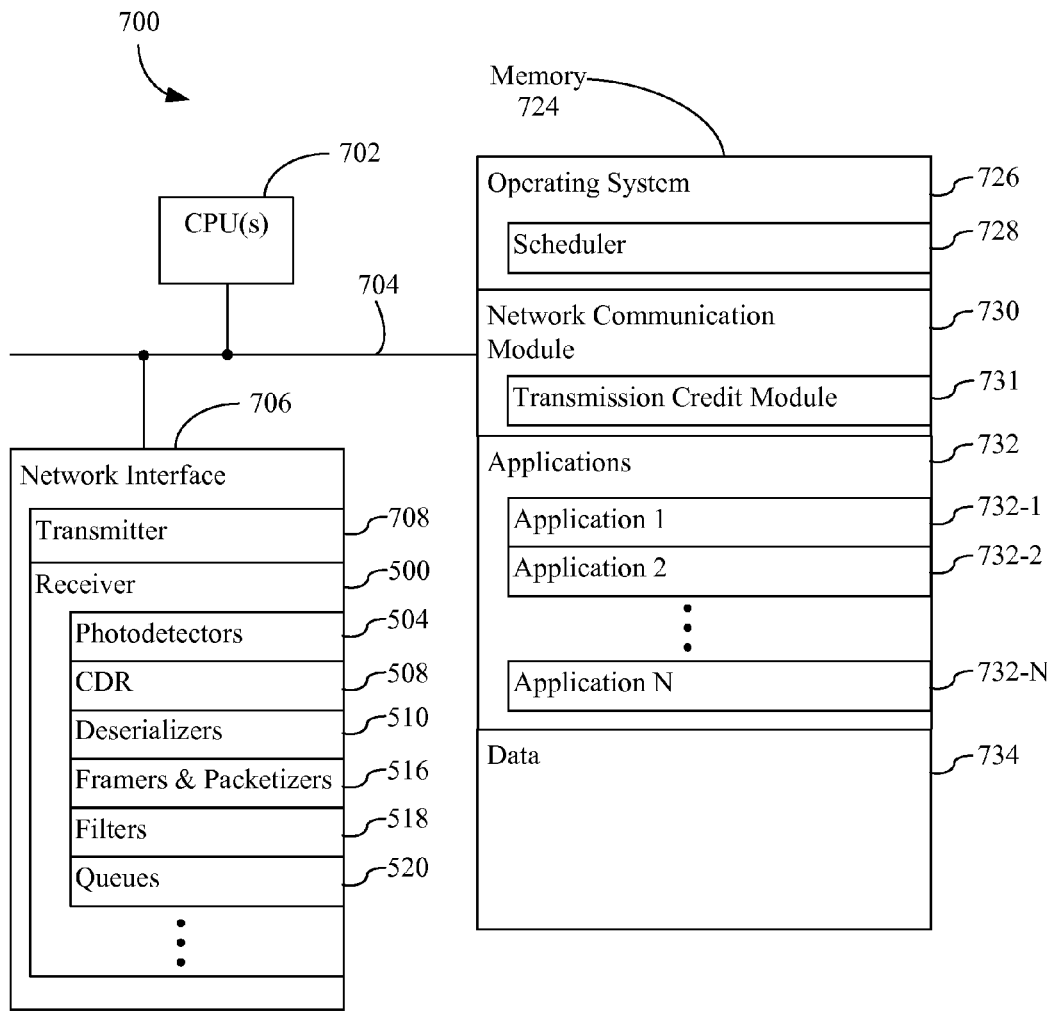
FIG. 7 is a block diagram illustrating a computer associated with a node in a star-configured network in accordance with some embodiments.

FIG. 7 is a block diagram illustrating a computer 700 associated with a node in a star-configured network (e.g., a node 102 in network 100, FIG. 1A) in accordance with some embodiments. The computer 700 typically includes one or more processing units (CPU's) 702, one or more network or other communications interfaces 706, memory 724, and one or more communication buses 704 for interconnecting these components. The communication buses 704 may include circuitry (sometimes called a chipset) that interconnects and controls communications between system components. The one or more CPUs 702 include one or more processors, each including one or more processing cores.

In some embodiments, the one or more network interfaces 706 include a transmitter 708 and a receiver 500. In some embodiments, the receiver 500 includes photodetectors 504 (e.g., parallel photodetectors) to convert optical signals into electrical signals; CDR circuitry 508 to extract serial data streams from electrical signals; deserializers 510 to convert received serial data streams into data words, framing and packetizing circuitry 516 to frame received data and assemble the data into packets, filters 518 to either discard packets or forward packets on for processing, and queues 520 to store packets for processing by the one or more CPUs 702. The receiver 504 may optionally include additional components, some of which have been discussed above, and may optionally include a subset of the aforementioned components. For example, filters 518 may be implemented in software (stored in memory 724) executed by the CPU(s) 702, instead of the receiver 500.

Memory 724 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 724 may optionally include one or more storage devices remotely located from the CPU(s) 702. In some embodiments, memory 724 stores the following programs, modules and data structures, or a subset thereof:

- an operating system 726 that includes procedures for handling various basic system services and for performing hardware dependent tasks;
- a scheduler 728 included in the operating system 726 to schedule processing of received data, for example by scheduling transfer of received data from the network interface 706 into memory 724;
- a network communication module 730 that is used for connecting the computer 700 to other computers via the one or more network interfaces 706 and the star-configured network;
- a transmission credit module 731 included in the network communication module 730 to track available transmission credits from other nodes and to assign transmission credits to other nodes;
- applications 732 to be executed by the one or more CPU(s) 702; and
- data 734, including data received via the one or more network interfaces 706.

Each of the above identified elements in memory 724 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 724 may store a subset of the modules and data structures identified above. Furthermore, memory 724 may store additional modules and data structures not described above.

Although not shown in the Figures, a computer 700 associated with a respective node 102 may have one or more additional communication interfaces for communicating with other computers or devices. For example, one or more of the nodes 102 may have a local area network (LAN) interface or other interface that enables the node 102 to communicate with other computers or devices via the Internet, other wide area network, a local area network, or any other suitable communication network or combination of networks.

In some embodiments, a star-configured network (e.g., network 100) is implemented on a single integrated circuit, such as a silicon integrated circuit. For example, a node 102 of the network 100 may correspond to one or more processing elements, such as a processing core, on the integrated circuit.

Figure 8A:
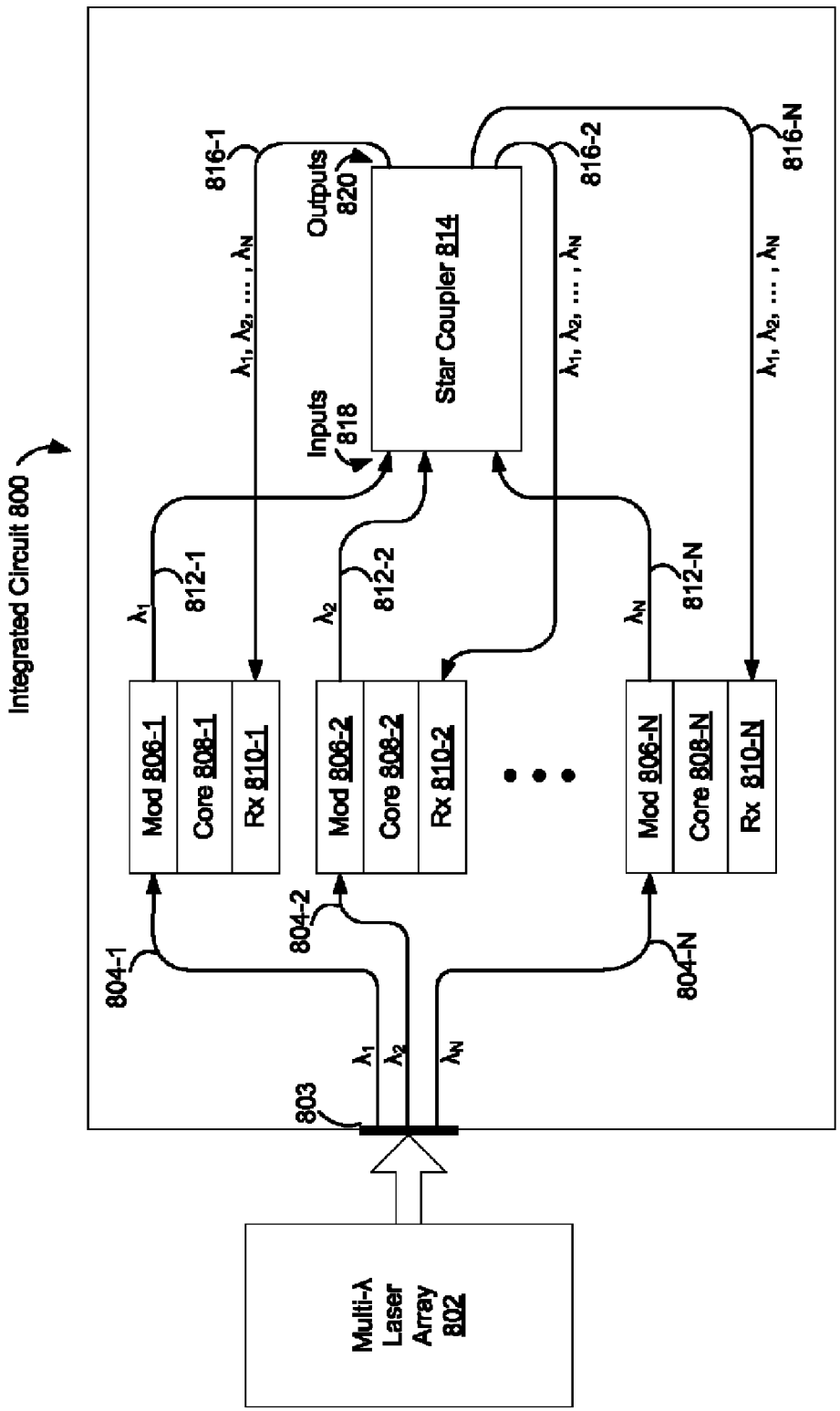
FIGS. 8A-8C illustrate a star-configured network implemented on an integrated circuit in accordance with some embodiments.

FIG. 8A illustrates a star-configured network 800 implemented on an integrated circuit in accordance with some embodiments. A plurality of processing cores 808, which correspond to nodes 102 of network 100 (FIG. 1A), are coupled through a star coupler 814. Associated with each processing core 808 is a modulator 806, which corresponds to a transmitter 104, and a receiver 810, which corresponds to a receiver 106. In some embodiments, the receivers 810 are fabricated using silicon-germanium (SiGe). In some embodiments, the integrated circuit 800 also includes circuitry coupled to the star coupler 814 corresponding to one or more "listener" nodes and/or "talk only" nodes.

An optical port 803 receives continuous-wavelength (cw) optical transmissions from an external multi-wavelength laser array 802 (external to the network 800, the components of which are formed on the substrate of an integrated circuit). In some embodiments, the laser array 802 is an array of distributed feedback (DFB) lasers or distributed Bragg reflector (DBR) lasers. The cw transmissions received from the laser array 802 include cw transmissions at a plurality of wavelengths corresponding to respective processing cores 808. Waveguides 804 provide respective cw transmissions to respective modulators 806. For example, waveguide 804-1 provides a cw transmission having a wavelength $\lambda_1$ to modulator 806-1, and waveguide 804-N provides a cw transmission having a wavelength $\lambda_N$ to modulator 806-N.

In some embodiments, all the components of the network 800 shown in FIG. 8A, excluding the external laser array 802, are formed on the substrate (not shown) of a single integrated circuit (sometimes called a semiconductor die), and are all housed within the same integrated circuit housing (not shown). In some embodiments, the integrated circuit that includes the components of network 800 is fabricated on silicon (i.e., a silicon substrate).

A modulator 806 receives a respective cw transmission and modulates a signal onto the received transmission, thereby generating a data stream that is driven onto a waveguide 812 coupled to the star coupler 814. In some embodiments, the modulators 806 are phase modulators that modulate the phase of the received transmission. Because each modulator 806 receives a cw transmission having a distinct wavelength, each modulator 806 transmits at a distinct wavelength.

Waveguides 812 provide transmitted data streams from the modulators 806 to inputs 818 of the star coupler 814. The waveguides 812 thus serve as optical channels connecting the modulators 806 to the star coupler 814.

The star coupler receives, in parallel, data streams transmitted from the modulators 806 and retransmits, in parallel, each of the received data streams to each of the receivers 810. Waveguides 816 provide retransmitted data streams from outputs 820 of the star coupler 814 to the receivers 810. The waveguides 816 thus serve as optical channels connecting the star coupler 814 to the receivers 810.

Figure 8B:
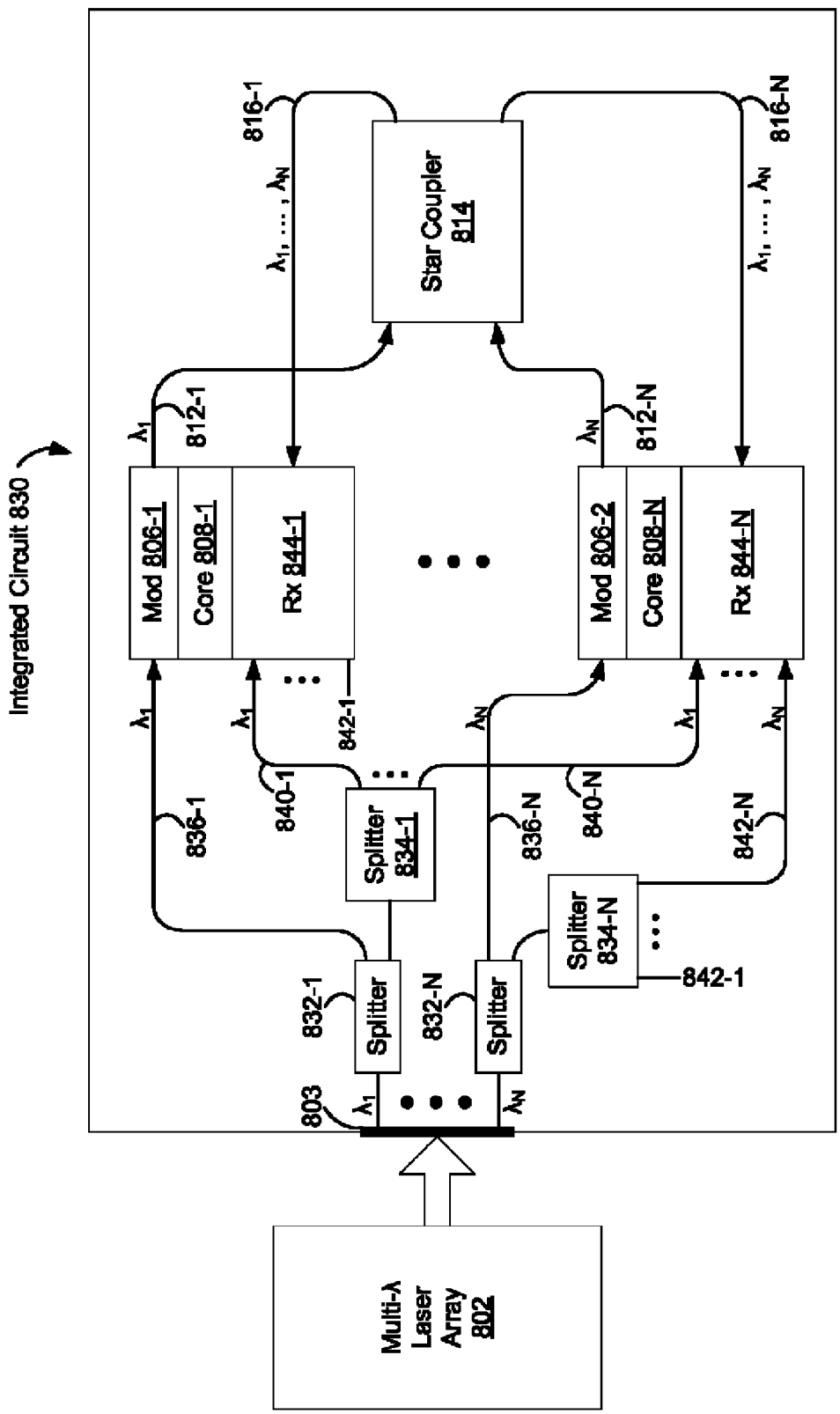

In some embodiments, as illustrated in FIG. 8B for integrated circuit 830, receivers 844 associated with processing cores 808 include coherent optical detectors. A coherent optical detector detects a signal, corresponding to a data stream, transmitted at a distinct wavelength by mixing the signal with a cw reference transmission of the distinct wavelength.

In the example of FIG. 8B, the integrated circuit 830 has N first splitters 832 and N second splitters 834, corresponding to the N input cw transmission wavelengths A through $\lambda_N$. A respective first splitter 832 provides a respective first cw transmission having a respective wavelength to a respective modulator 806 and to a respective second splitter 834. The respective second splitter 834 provides cw reference transmissions to respective coherent detectors in the receivers 844, enabling each receiver to detect transmissions at the respective wavelength and thus to detect data streams transmitted by each modulator 806. Dedicated waveguides (e.g., 836, 840, and 842) for each transmission wavelength provide the cw transmissions to the modulators 806 and receivers 844. Optionally, if a particular core **808-*i* does not need to receive the data in a particular data stream, then its receiver 844-*i*** need not include a detector for the wavelength used to transmit that particular data stream, and the dedicated waveguide 842 for transmitting that data stream to the receiver 844-$i$ can also be omitted.

For example, a first splitter 832-1 receives from the laser array 802, via the optical port 803, an input cw transmission having a wavelength A. The splitter 832-1 splits the input cw transmission into a first cw transmission, to be provided to modulator 806-1 via waveguide 836-1, and a second cw transmission to provide reference transmissions for coherent detectors in the receivers 844. In some embodiments, the first cw transmission has higher power than the second cw transmission. For example, the splitter 832-1 splits the input cw transmission such that the first cw transmission has 90% of the input power and the second cw transmission has 10% of the input power, ignoring any losses associated with the splitter.

A second splitter 834-1 splits the second cw transmission into multiple cw reference transmissions, which are provided to respective receivers 844 via waveguides 840. Specifically, the multiple cw reference transmissions are provided to respective coherent detectors in the receivers 844, thus enabling each receiver to detect transmissions having a wavelength A (i.e., transmissions from the modulator 806-1 of the first processing core 808-1).

Figure 9A:
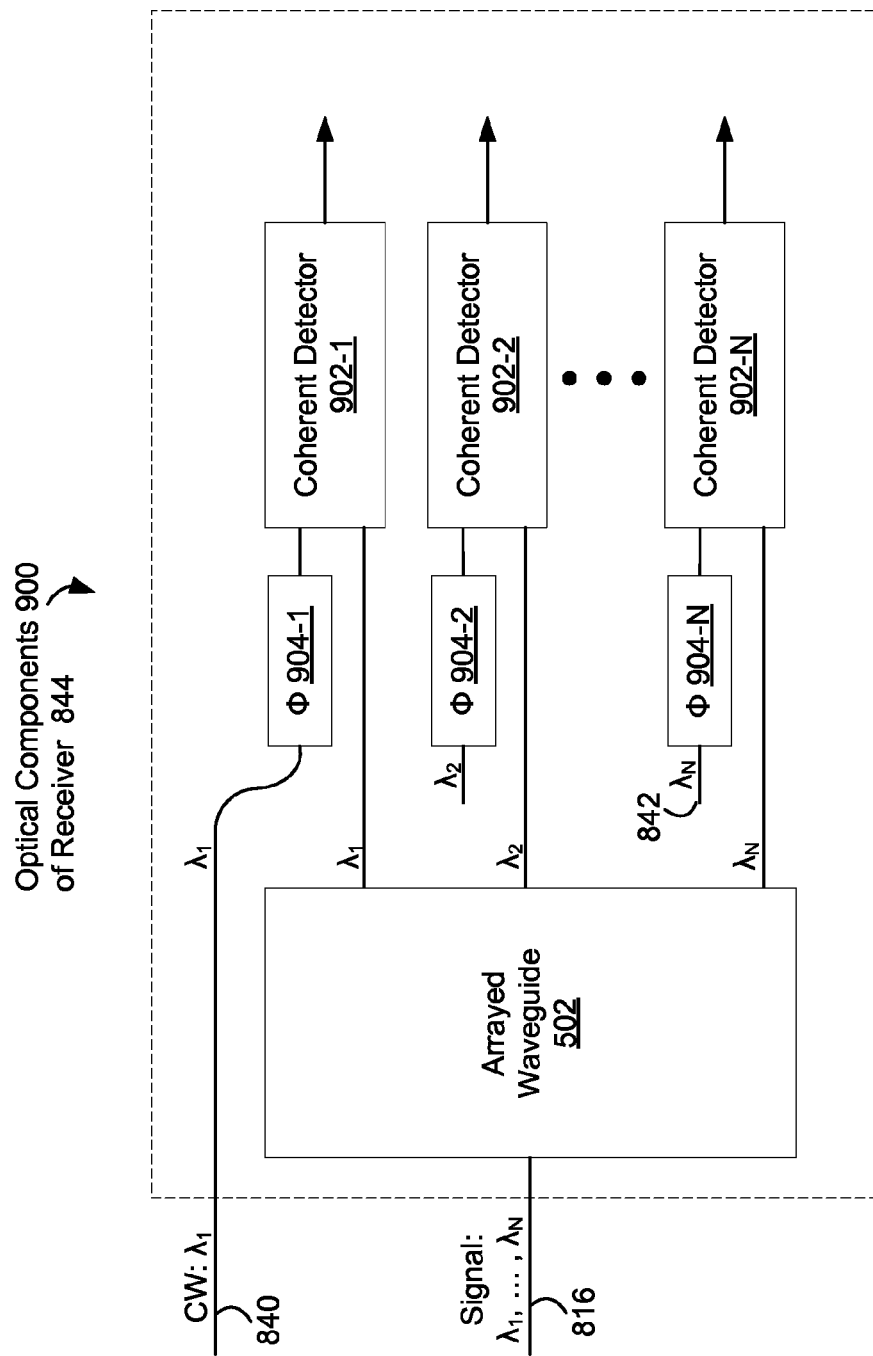
FIGS. 9A and 9B illustrate optical components of a receiver in accordance with some embodiments.

FIG. 9A illustrates optical components 900 of a receiver 844 in accordance with some embodiments. An arrayed waveguide 502 receives parallel transmissions from the star coupler 814 via a waveguide 816 and separates the received data streams into parallel channels corresponding to the transmission wavelengths. The parallel channels are provided to respective coherent detectors 902. In some other embodiments, lenses and gratings (i.e., grating dispersal optics) separate the received data streams into parallel channels. Separating transmissions into parallel channels prior to the coherent detector provides an initial stage of cross-talk rejection; the coherent detector then provides additional cross-talk rejection, resulting in a highly sensitive receiver. In some embodiments, however, the received data streams are not split into separate channels prior to the coherent detectors 902. Instead, for example, a splitter provides the data streams transmitted via waveguide 816 to each coherent detector 902.

Each coherent detector also receives a cw reference transmission via a waveguide (e.g., 840 for $\lambda_1$ and 842 for $\lambda_N$), which is mixed with the respective transmission from the star coupler 814 to enable coherent optical detection. A phase adjuster (Φ) 904 adjusts the phase of the cw reference transmission provided to a respective coherent detector 902, to match the phase of the reference transmission to the phase of the transmission received from the star coupler 814. The degree of phase adjustment provided by the phase adjuster 904 can be determined, for example, by minimizing or zeroing the DC output of the coherent detector 902.

The coherent detector 902 produces an electrical signal corresponding to the transmission (i.e., to the received data stream). The electrical signal is provided to subsequent circuitry in the receiver 844, such as a transimpedance amplifier (e.g., TIA 506, FIG. 5A).

Figure 8C:
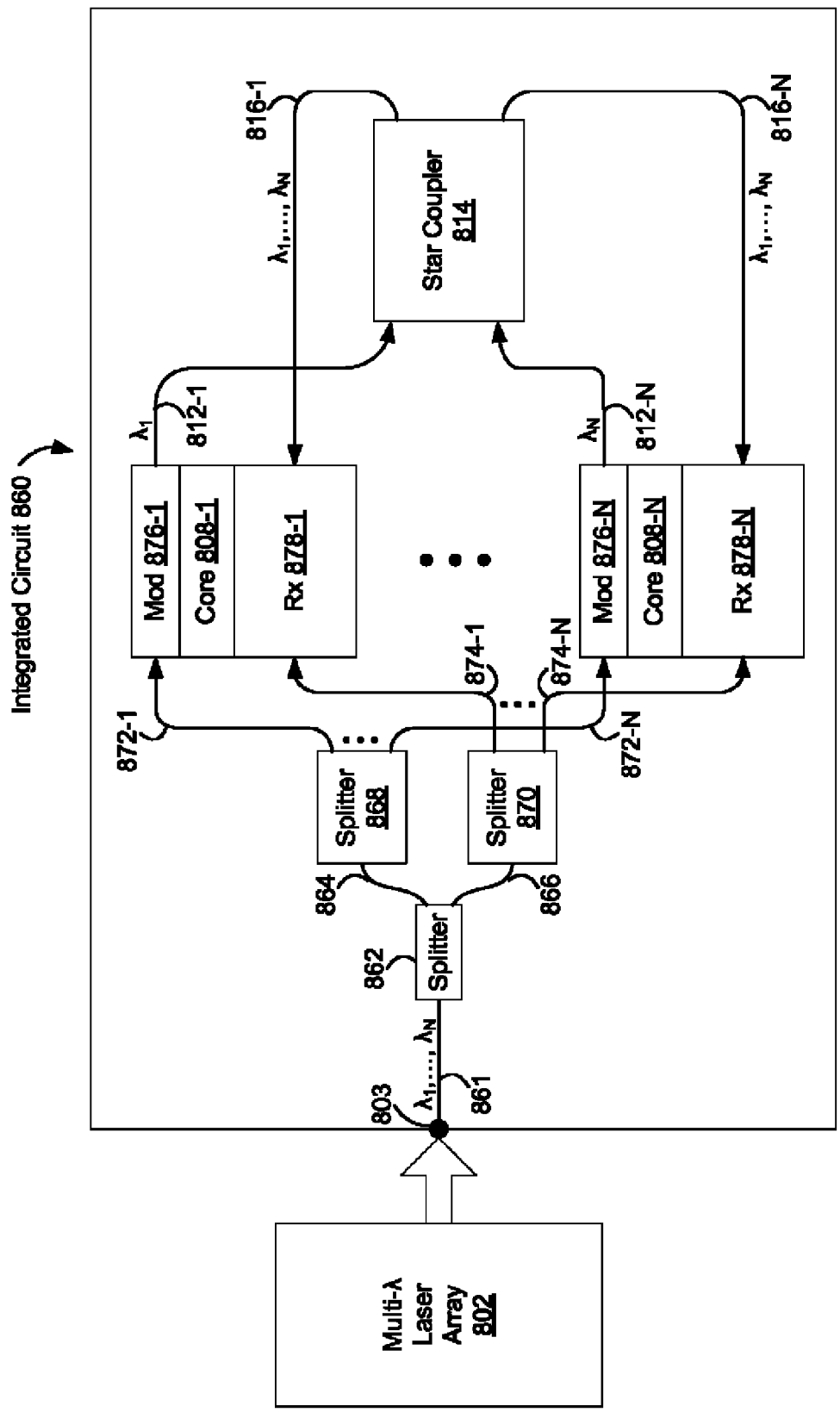

In some embodiments, multiple cw transmissions having distinct wavelengths are provided via a common set of waveguides and splitters, as illustrated in FIG. 8C in accordance with some embodiments. The integrated circuit 860 of FIG. 8C receives from the laser array 802, via the optical port 803, a plurality of input cw transmissions having respective wavelengths $\lambda_1, \ldots, \lambda_N$. A waveguide 861 provides the input cw transmissions to a first splitter 862, which splits the input cw transmissions into a plurality of first cw transmissions, to be provided to modulators 876, and a plurality of second cw transmissions, to serve as reference transmissions for coherent detectors in receivers 878. In some embodiments, the first splitter 862 is configured such that a respective first cw transmission has higher power than a respective second cw transmission. For example, the splitter 862 splits the input cw transmissions such that a respective first cw transmission has 90% of the input power of a respective input cw transmission and a respective second cw transmission has 10% of the input power of the respective input cw transmission, ignoring any losses associated with the splitter.

A waveguide 866 provides the plurality of second cw transmissions to a second splitter 870 that splits each transmission into multiple cw reference transmissions that are provided via waveguides 874 to coherent detectors in receivers 878.

A waveguide 864 provides the plurality of first cw transmissions to a third splitter 868 that splits the transmissions and provides them to modulators 876 via waveguides 872. In some embodiments, each modulator 876 is an optical phase modulator that modulates a signal onto the cw transmission having a wavelength corresponding to the modulator 876 (e.g., a wavelength assigned to the modulator) and filters out the remaining cw transmissions.

Figure 9B:
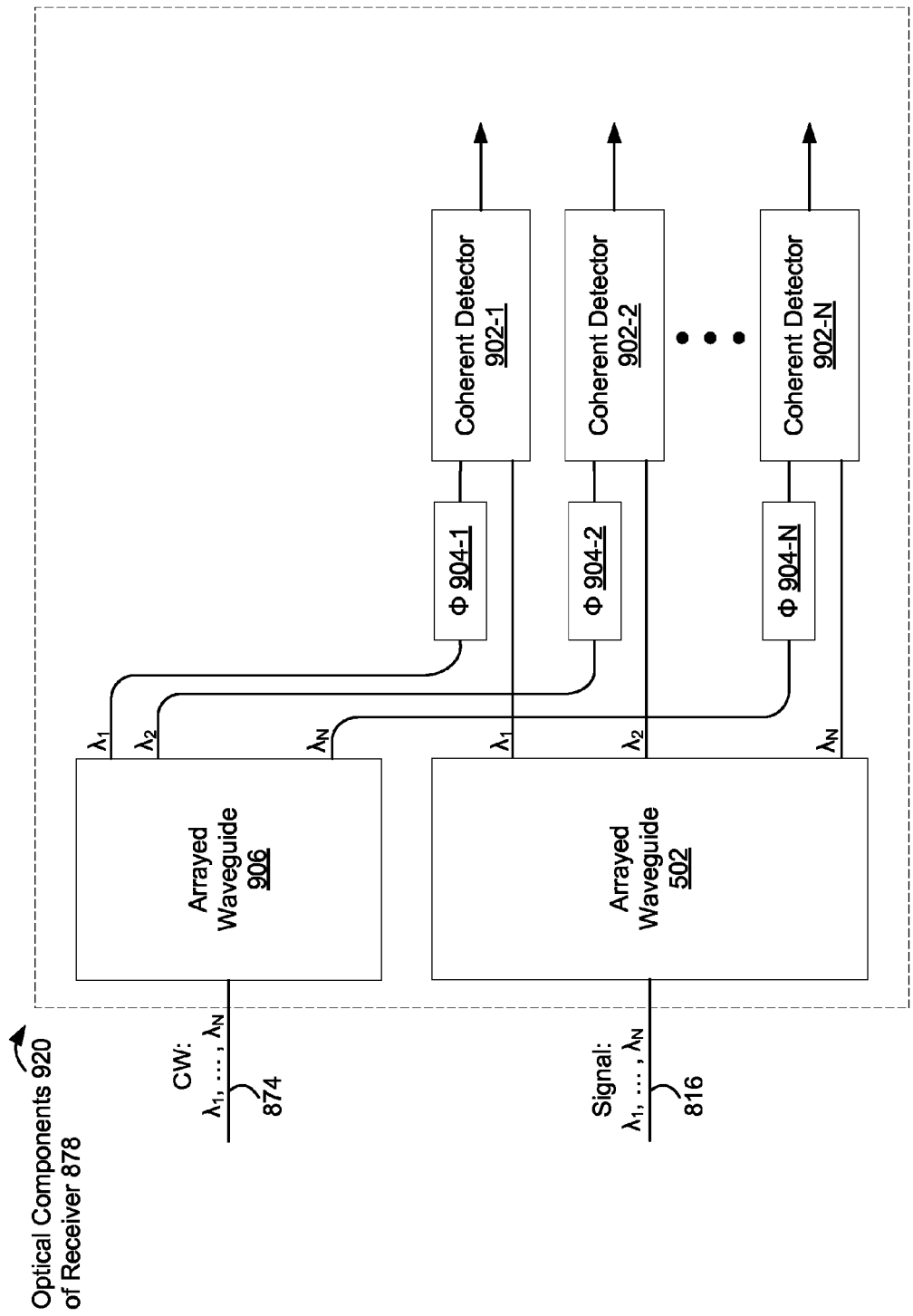

FIG. 9B illustrates optical components 920 of a respective receiver 878 (FIG. 8C) in accordance with some embodiments. An arrayed waveguide 502 receives parallel transmissions from the star coupler 814 via a waveguide 816 and separates the received transmissions into parallel channels corresponding to the transmission wavelengths. The parallel channels are provided to respective coherent detectors 902.

An additional arrayed waveguide 906 receives multiple cw reference transmissions from the second splitter 870, separates them, and provides the respective reference transmissions to respective phase adjusters 904, which provide phase-adjusted reference transmissions to respective coherent detectors 902, as described for FIG. 9A. Thus, a coherent detector 902 receives a reference transmission with a wavelength equal to the wavelength of the transmission that the detector receives from the AWG 502. The coherent detector 902 mixes the two transmissions and produces an electrical signal corresponding to a received data stream. The electrical signal is provided to subsequent circuitry in the receiver 878, such as a transimpedance amplifier (e.g., TIA 506, FIG. 5A).

Figure 10:
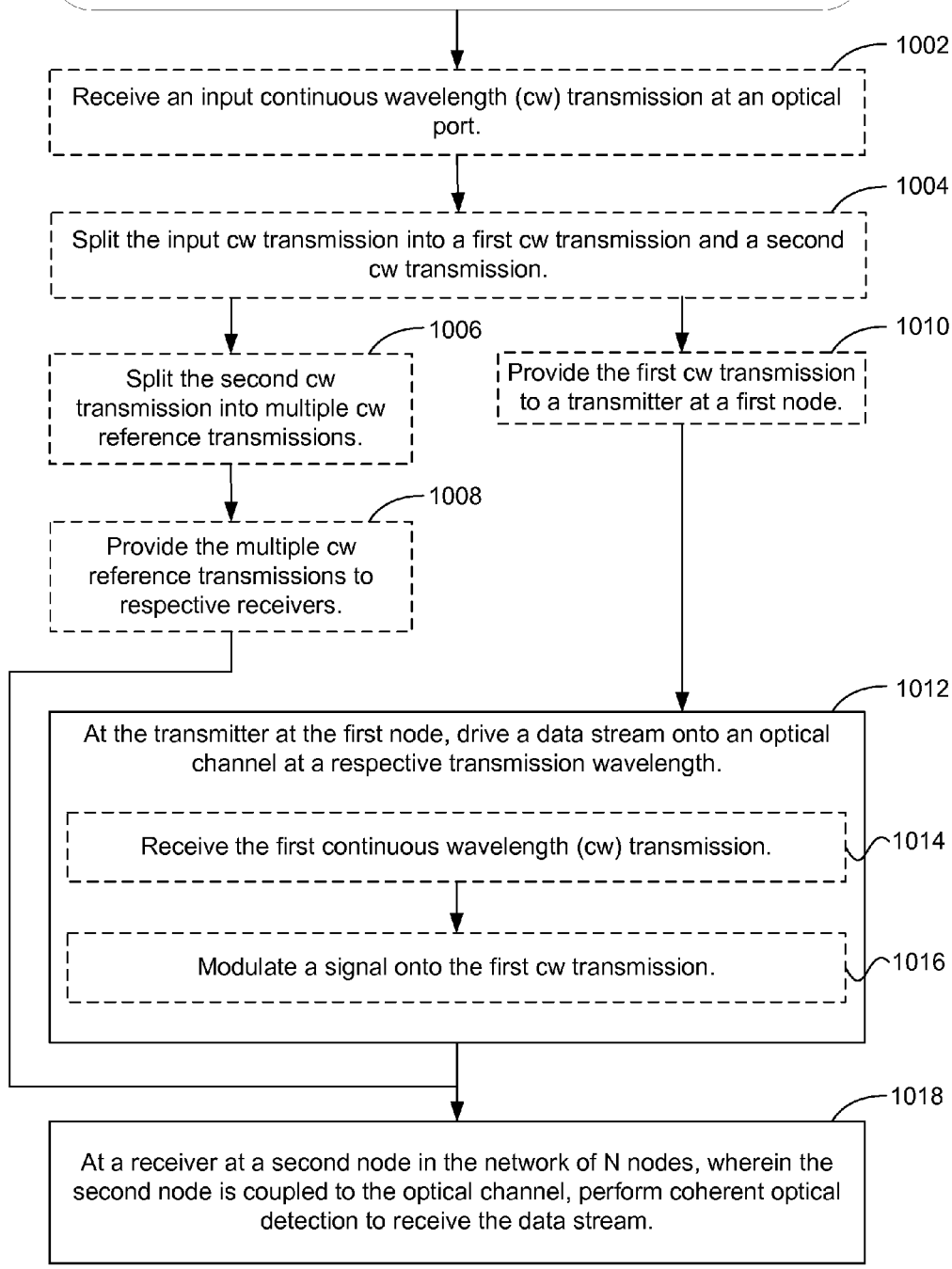
FIG. 10 is a flow diagram illustrating a method of communicating data for use in conjunction with a network of N nodes implemented on a semiconductor integrated circuit, in accordance with some embodiments.

FIG. 10 is a flow diagram illustrating a method 1000 of communicating data for use in conjunction with a network of N nodes implemented on a semiconductor integrated circuit (e.g., IC 800, 830, or 860, FIGS. 8A-8C), in accordance with some embodiments. Each node includes a transmitter and a receiver. While the method 1000 described below includes operations that appear to occur in a specific order, it should be apparent that the method 1000 can include more or fewer operations, that two or more of the operations can be performed in parallel, and that two or more operations can be combined into a single operation. For example, all of the operations of the method 1000 can be performed in parallel.

In some embodiments, an input cw transmission is received (1002) at an optical port (e.g., 803). The input cw transmission is split (1004) (e.g., by a first splitter 832 or 862) into a first cw transmission and a second cw transmission. The first cw transmission is provided (1010) to a transmitter at a first node. For example, waveguide 836 (FIG. 8B) provides the first cw transmission to modulator 806-1 of processing core 808-1. The second cw transmission is split (1006) into multiple cw references transmissions, which are provided (1008) to respective receivers. For example, splitter 834 splits the second cw transmission and waveguides 840 provide the resulting cw reference transmissions to receivers 844.

At the transmitter at the first node, a data stream is driven (1012) onto an optical channel (e.g., a channel 812) at a respective transmission wavelength. In some embodiments, the first cw transmission is received (1014) and a signal is modulated (1016) onto it.

A receiver at a second node is coupled to the optical channel. The second receiver performs (1018) coherent optical detection to receive the data stream. For example, a coherent detector 902 of a receiver 844 or 878 receives the data stream.

The coherent optical detection performed in the method 1000 provides high-sensitivity optical detection to enable on-chip optical communications.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A data communications network, comprising:
   N nodes, where N is an integer greater than one, wherein each node comprises a transmitter and a receiver; and
   a star coupler coupled to each of the N nodes and configured to receive, in parallel, data streams transmitted from a plurality of the N nodes, and to passively retransmit, in parallel, each of the received data streams to each node of the N nodes;
   wherein:
   each receiver is configured to receive multiple data streams in parallel on respective wavelengths of a set of wavelengths and each receiver includes:
      an arrayed waveguide to receive transmissions from the star coupler and to separate the received transmissions into parallel channels corresponding to distinct transmission wavelengths;
      a plurality of parallel photodetectors, wherein each photodetector converts an optical signal on a respective channel into an electrical signal;
      data recovery circuitry coupled to the parallel photodetectors to extract data from the electrical signals;
      packetizing circuitry to assemble extracted data into packets;
      memory to store the assembled data packets; and
      logic circuitry to prioritize processing of assembled data packets; and
   each transmitter is configured to transmit data streams at a distinct transmission wavelength of the set of wavelengths.

2. The network of claim 1, wherein the distinct transmission wavelength of a respective transmitter is tunable.

3. The network of claim 2, further comprising a network controller, which is configured to assign the distinct transmission wavelength of a respective transmitter.

4. The network of claim 1, wherein a respective receiver further comprises:
   logic circuitry to process an assembled packet if a first destination-based criterion is satisfied; and
   filter circuitry to discard an assembled packet if a second destination-based criterion is satisfied.

5. The network of claim 1, wherein a respective node corresponds to a cluster of processors.

6. The network of claim 1, wherein a respective node corresponds to a network switch.

7. The network of claim 1, wherein the N nodes and the star coupler are implemented in a single integrated circuit.

8. The network of claim 7, wherein a respective node corresponds to a processing core in the single integrated circuit.

9. The network of claim 7, wherein a respective receiver comprises a plurality of coherent optical detectors.

10. The network of claim 7, wherein a respective transmitter is configured to receive a continuous wavelength (cw) optical transmission and to modulate a signal onto the cw optical transmission, wherein the signal corresponds to a respective data stream of the data streams transmitted from the plurality of the N nodes.

11. The network of claim 10, wherein the respective transmitter comprises an optical phase modulator.

12. The network of claim 7, wherein the integrated circuit is fabricated on silicon.

13. The network of claim 12, wherein a respective receiver is fabricated using silicon-germanium (SiGe).

14. A data communications network, for use in conjunction with an optical channel having a first terminus and a second terminus, comprising:
   a first set of M nodes and a second set of N nodes, where M and N are integers greater than one, wherein each node of the first and second sets comprises a transmitter and a receiver;
   a first star coupler coupled to the first set of M nodes and to the first terminus of the optical channel; and
   a second star coupler coupled to the second set of N nodes and to the second terminus of the optical channel;
   wherein:
   the first star coupler is configured to receive, in parallel, data streams transmitted from a plurality of the M nodes, and to passively retransmit each of the received data streams to the second star coupler and to each node of the M nodes; wherein the passively retransmitted data streams comprise a set of parallel data streams; and
   the second star coupler is configured to receive, in parallel, the set of parallel data streams retransmitted by the first star coupler and to passively retransmit the set of received data streams to each of the N nodes;
   wherein:
   each receiver is configured to receive multiple data streams in parallel on respective wavelengths of a set of wavelengths and each receiver includes:
      an arrayed waveguide to receive transmissions from the star coupler and to separate the received transmissions into parallel channels corresponding to distinct transmission wavelengths;
      a plurality of parallel photodetectors, wherein each photodetector converts an optical signal on a respective channel into an electrical signal;
      data recovery circuitry coupled to the parallel photodetectors to extract data from the electrical signals;
      packetizing circuitry to assemble extracted data into packets;
      memory to store the assembled data packets; and
      logic circuitry to prioritize processing of assembled data packets; and
   each transmitter is configured to transmit data streams at a distinct transmission wavelength of the set of wavelengths.

15. The data communications network of claim 14, wherein the N nodes coupled to the second star coupler include a plurality of network components.

16. The data communications network of claim 14, wherein a respective node of the N nodes coupled to the second star coupler comprises a network component selected from the group consisting of a network switch, a router and a hub.

17. The network of claim 14, wherein the distinct transmission wavelength of a respective transmitter is tunable.

18. The network of claim 17, further comprising a network controller, which is configured to assign the distinct transmission wavelength of a respective transmitter.

19. The network of claim 14, wherein a respective receiver further comprises:
   logic circuitry to process an assembled packet if a first destination-based criterion is satisfied; and
   filter circuitry to discard an assembled packet if a second destination-based criterion is satisfied.

20. A method of communicating data, for use in conjunction with a network of N nodes, wherein each node comprises a transmitter and a receiver, comprising:
   at a first node in the network of N nodes:
      transmitting a first data stream to a star coupler coupled to each of the N nodes, wherein the star coupler is configured to receive, in parallel, data streams transmitted from a plurality of the N nodes, and to passively retransmit, in parallel, each of the received data streams to each node of the N nodes;
      receiving multiple data streams in parallel from the star coupler on respective wavelengths of a set of wavelengths;
      separating the received data streams into optical signals on parallel channels according to the respective wavelengths;
      converting the respective optical signals into respective electrical signals;
      recovering data from the respective electrical signals;
      assembling the recovered data into packets;
      storing the assembled packets; and
      prioritizing the processing of the assembled packets.

21. The method of claim 20, wherein the first data stream is transmitted at a first transmission wavelength of the set of wavelengths, and wherein each data stream of the received multiple data streams has a distinct associated transmission wavelength of the set of wavelengths.

22. The method of claim 20, further comprising tuning a distinct transmission wavelength of a respective transmitter.

23. The method of claim 22, further comprising assigning at least one distinct transmission wavelength of a respective transmitter.

24. The method of claim 20, further comprising:
   processing an assembled packet at least in response to the satisfaction of a first destination-based criterion; and
   discarding an assembled packet at least in response to the satisfaction of a second destination-based criterion.

* * * * *